United States Patent
Nguyen

(10) Patent No.: US 11,631,297 B1
(45) Date of Patent: Apr. 18, 2023

(54) SPONTANEOUS PLAYER PREFERENCES

(71) Applicant: Aristocrat Technologies, Inc. (ATI), Las Vegas, NV (US)

(72) Inventor: Binh T. Nguyen, Reno, NV (US)

(73) Assignee: ARISTORCRAT TECHNOLOGIES, INC. (ATI), Las Vegas, NV (US)

( * ) Notice: Subject to any disclaimer, the term of this patent is extended or adjusted under 35 U.S.C. 154(b) by 28 days.

(21) Appl. No.: 15/671,133

(22) Filed: Aug. 7, 2017

Related U.S. Application Data

(63) Continuation of application No. 14/189,948, filed on Feb. 25, 2014, now Pat. No. 9,875,606, which is a continuation of application No. 12/757,968, filed on Apr. 9, 2010, now Pat. No. 8,696,470.

(51) Int. Cl.
   *G07F 17/32* (2006.01)
   *G06Q 30/02* (2023.01)

(52) U.S. Cl.
   CPC .......... *G07F 17/323* (2013.01); *G06Q 30/02* (2013.01)

(58) Field of Classification Search
   CPC .............................. G07F 17/323; G06Q 30/02
   See application file for complete search history.

(56) References Cited

U.S. PATENT DOCUMENTS

| | | |
|---|---|---|
| 2,033,638 A | 3/1936 | Koppl |
| 2,062,923 A | 12/1936 | Nagy |
| 4,741,539 A | 5/1988 | Sutton et al. |
| 4,948,138 A | 8/1990 | Pease et al. |
| 4,969,183 A | 11/1990 | Reese |
| 5,067,712 A | 11/1991 | Georgilas |
| 5,275,400 A | 1/1994 | Weingardt |
| 5,429,361 A | 7/1995 | Raven et al. |
| 5,489,103 A | 2/1996 | Okamoto |
| 5,618,232 A | 4/1997 | Martin |
| 5,630,757 A | 5/1997 | Gagin |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Notice of Allowance for U.S. Appl. No. 15/293,751, dated Aug. 4, 2017.

(Continued)

*Primary Examiner* — Thomas J Hong
*Assistant Examiner* — Carl V Larsen
(74) *Attorney, Agent, or Firm* — McAndrews, Held & Malloy, Ltd.

(57) ABSTRACT

An apparatus, method, and system to present at least one game offering on a display of a gaming machine may include a portable electronic device having at least one sensor configured to acquire at least one interest data based on at least one user action, the at least one user action being used to initiate acquisition of data associated with the at least one interest data, the at least one interest data associated with at least one gaming establishment offering and presented throughout the gaming establishment; a processor operative with an interest data application; and a memory configured to store the at least one interest data and the interest data application.

33 Claims, 11 Drawing Sheets

(56) References Cited

U.S. PATENT DOCUMENTS

| | | |
|---|---|---|
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,271 A | 11/2000 | Kadlic |
| 6,146,273 A | 11/2000 | Olsen |
| 6,165,071 A | 12/2000 | Weiss |
| 6,231,445 B1 | 5/2001 | Acres |
| 6,244,958 B1 | 6/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beni et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,500,067 B1 | 12/2002 | Luciano |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,675,152 B1 | 1/2004 | Prasad |
| 6,699,128 B1 | 3/2004 | Beadell |
| 6,719,630 B1 | 4/2004 | Seelig et al. |
| 6,749,510 B2 | 6/2004 | Giobbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,047,205 B2 | 5/2006 | Hale |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Chaffin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| 7,198,571 B2 * | 4/2007 | LeMay .................. G07F 17/32 463/25 |
| RE39,644 E | 5/2007 | Alcorn et al. |
| 7,217,191 B2 | 5/2007 | Allen et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 | 12/2007 | Danieli |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Huber |
| 7,699,703 B2 | 4/2010 | Muir |
| 7,722,453 B2 | 5/2010 | Lark et al. |
| 7,742,996 B1 | 6/2010 | Kwan |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |

(56) References Cited

U.S. PATENT DOCUMENTS

| | | |
|---|---|---|
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh |
| 8,133,113 B2 | 3/2012 | Nguyen |
| 8,133,133 B2 | 3/2012 | Nguyen |
| 8,182,326 B2 | 5/2012 | Speer et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Homik |
| 8,430,745 B2 | 4/2013 | Agarwal et al. |
| 8,461,958 B2 | 6/2013 | Saenz |
| 8,465,368 B2 | 6/2013 | Hardy et al. |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,678,901 B1 | 3/2014 | Kelly |
| 8,696,470 B2 | 4/2014 | Nguyen |
| 8,745,417 B2 | 6/2014 | Huang et al. |
| 8,821,255 B1 | 9/2014 | Friedman |
| 8,834,254 B2 | 9/2014 | Buchholz et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,530,277 B2 | 12/2016 | Nelson et al. |
| 9,576,425 B2 | 2/2017 | Nguyen |
| 9,626,826 B2 | 4/2017 | Nguyen |
| 9,666,015 B2 | 5/2017 | Acres |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi et al. |
| 10,068,429 B2 | 9/2018 | Gagner et al. |
| 10,115,270 B2 | 10/2018 | Gagner et al. |
| 10,140,816 B2 | 11/2018 | Nguyen |
| 10,325,447 B2 | 6/2019 | Malek |
| 10,421,010 B2 | 9/2019 | Nguyen |
| 10,438,446 B2 | 10/2019 | Nguyen |
| 10,445,978 B2 | 10/2019 | Nguyen |
| 10,818,133 B2 | 10/2020 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0025272 A1 | 9/2001 | Mori |
| 2001/0031659 A1 | 10/2001 | Perrie |
| 2001/0047291 A1 | 11/2001 | Garahi |
| 2002/0006822 A1 | 1/2002 | Krintzman |
| 2002/0042295 A1 | 4/2002 | Walker et al. |
| 2002/0043759 A1 | 4/2002 | Vancura |
| 2002/0045474 A1 | 4/2002 | Singer |
| 2002/0107065 A1 | 8/2002 | Rowe |
| 2002/0107799 A1 | 8/2002 | Hoshino et al. |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1* | 10/2002 | Lark ............... G06Q 20/382 463/16 |
| 2002/0145051 A1 | 10/2002 | Charrin |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0177483 A1 | 11/2002 | Cannon |
| 2002/0183105 A1 | 12/2002 | Cannon et al. |
| 2003/0001338 A1 | 1/2003 | Bennett et al. |
| 2003/0003996 A1 | 1/2003 | Nguyen |
| 2003/0004871 A1 | 1/2003 | Rowe et al. |
| 2003/0008696 A1 | 1/2003 | Abecassis et al. |
| 2003/0013531 A1 | 1/2003 | Rowe |
| 2003/0027635 A1 | 2/2003 | Walker et al. |
| 2003/0064805 A1 | 4/2003 | Wells |
| 2003/0064807 A1 | 4/2003 | Walker et al. |
| 2003/0078094 A1 | 4/2003 | Gatto |
| 2003/0092480 A1 | 5/2003 | White et al. |
| 2003/0100361 A1 | 5/2003 | Sharpless et al. |
| 2003/0103965 A1 | 6/2003 | Jung |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082384 A1 | 4/2004 | Walker |
| 2004/0082385 A1 | 4/2004 | Silva et al. |
| 2004/0094624 A1 | 5/2004 | Fernandes |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0142744 A1 | 7/2004 | Atkinson |
| 2004/0147308 A1 | 7/2004 | Walker et al. |
| 2004/0152508 A1 | 8/2004 | Lind |
| 2004/0199631 A1 | 10/2004 | Natsume |
| 2004/0214622 A1 | 10/2004 | Atkinson |
| 2004/0224753 A1 | 11/2004 | Odonovan et al. |
| 2004/0229671 A1 | 11/2004 | Stronach |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0033651 A1 | 2/2005 | Kogan |
| 2005/0043996 A1 | 2/2005 | Silver |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0130731 A1 | 6/2005 | Englman |
| 2005/0137014 A1 | 6/2005 | Vetelaninen |
| 2005/0143169 A1 | 6/2005 | Nguyen |
| 2005/0167921 A1 | 8/2005 | Finocchio |

(56) References Cited

U.S. PATENT DOCUMENTS

| | | |
|---|---|---|
| 2005/0170883 A1 | 8/2005 | Muskin et al. |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202865 A1 | 9/2005 | Kim |
| 2005/0202875 A1 | 9/2005 | Murphy et al. |
| 2005/0208993 A1 | 9/2005 | Yoshizawa |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0068897 A1 | 3/2006 | Sanford |
| 2006/0073869 A1 | 4/2006 | LeMay et al. |
| 2006/0073888 A1 | 4/2006 | Nguyen |
| 2006/0073897 A1 | 4/2006 | Englman et al. |
| 2006/0079317 A1 | 4/2006 | Flemming et al. |
| 2006/0121972 A1* | 6/2006 | Walker .................... G07F 17/32 463/16 |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0256135 A1 | 11/2006 | Aoyama |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1* | 4/2007 | Moser .................... G06Q 30/02 463/42 |
| 2007/0093299 A1 | 4/2007 | Bergeron |
| 2007/0129123 A1 | 6/2007 | Eryou et al. |
| 2007/0129148 A1 | 6/2007 | Van Luchene |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0176898 A1 | 8/2007 | Suh |
| 2007/0178912 A1 | 8/2007 | Baranowski |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0219000 A1 | 9/2007 | Eiji |
| 2007/0235521 A1 | 10/2007 | Mateen |
| 2007/0238505 A1 | 10/2007 | Okada |
| 2007/0241187 A1 | 10/2007 | Alderucci et al. |
| 2007/0243929 A1 | 10/2007 | Skotarczak |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259716 A1 | 11/2007 | Mattice |
| 2007/0259717 A1 | 11/2007 | Mattice et al. |
| 2007/0265984 A1 | 11/2007 | Santhana |
| 2007/0270211 A1 | 11/2007 | Moshal |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298858 A1 | 12/2007 | Toneguzzo |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0020845 A1* | 1/2008 | Low .................... G07F 17/32 463/42 |
| 2008/0032787 A1* | 2/2008 | Low .................... G07F 17/32 463/29 |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102916 A1 | 5/2008 | Kovacs |
| 2008/0102935 A1 | 5/2008 | Finnimore |
| 2008/0102956 A1 | 5/2008 | Burman et al. |
| 2008/0102957 A1 | 5/2008 | Burnman et al. |
| 2008/0108401 A1 | 5/2008 | Baerlocker et al. |
| 2008/0113772 A1 | 5/2008 | Burrill et al. |
| 2008/0119267 A1 | 5/2008 | Denlay |
| 2008/0126529 A1 | 5/2008 | Kim et al. |
| 2008/0146321 A1 | 6/2008 | Parente |
| 2008/0146344 A1 | 6/2008 | Rowe et al. |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0167118 A1 | 7/2008 | Kroeckel |
| 2008/0182667 A1 | 7/2008 | Davis et al. |
| 2008/0200251 A1 | 8/2008 | Alderucci et al. |
| 2008/0207307 A1 | 8/2008 | Cunningham, II et al. |
| 2008/0167130 A1 | 9/2008 | Koreckel |
| 2008/0214258 A1 | 9/2008 | Brosnan et al. |
| 2008/0214310 A1 | 9/2008 | Brunet De Courssou |
| 2008/0215319 A1 | 9/2008 | Lu |
| 2008/0218312 A1 | 9/2008 | Asher |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0248865 A1 | 10/2008 | Cole |
| 2008/0252419 A1 | 10/2008 | Batchelor |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0261685 A1 | 10/2008 | Muir |
| 2008/0263173 A1 | 10/2008 | Weber et al. |
| 2008/0268959 A1 | 10/2008 | Bryson |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0017906 A1 | 1/2009 | Jackson |
| 2009/0021380 A1* | 1/2009 | Higuchi .................... G01D 21/00 340/573.1 |
| 2009/0029766 A1 | 1/2009 | Lutnick et al. |
| 2009/0054149 A1 | 2/2009 | Brosnan et al. |
| 2009/0061990 A1 | 3/2009 | Schwartz |
| 2009/0077396 A1 | 3/2009 | Tsai et al. |
| 2009/0088258 A1 | 4/2009 | Saunders |
| 2009/0098925 A1 | 4/2009 | Gagner et al. |

(56) References Cited

U.S. PATENT DOCUMENTS

| | | |
|---|---|---|
| 2009/0104977 A1 | 4/2009 | Zielinski |
| 2009/0104983 A1 | 4/2009 | Okada |
| 2009/0117989 A1 | 5/2009 | Arezina |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131146 A1 | 5/2009 | Arezina et al. |
| 2009/0131151 A1 | 5/2009 | Harris et al. |
| 2009/0131155 A1 | 5/2009 | Hollibaugh |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0143141 A1* | 6/2009 | Wells ............ G07F 17/32 463/37 |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0163272 A1 | 6/2009 | Baker |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1* | 8/2009 | Canora ............ G06Q 30/02 705/346 |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0270166 A1 | 10/2009 | Thukral |
| 2009/0270170 A1* | 10/2009 | Patton ............ A63F 13/10 463/36 |
| 2009/0271287 A1 | 10/2009 | Halpern |
| 2009/0275402 A1 | 11/2009 | Backover |
| 2009/0275410 A1 | 11/2009 | Kisenwether et al. |
| 2009/0275411 A1 | 11/2009 | Kisenwether et al. |
| 2009/0280910 A1 | 11/2009 | Gagner et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0105454 A1 | 4/2010 | Weber et al. |
| 2010/0106612 A1 | 4/2010 | Gupta |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0184509 A1 | 7/2010 | Sylla |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203957 A1 | 8/2010 | Enzminger |
| 2010/0203963 A1 | 8/2010 | Allen |
| 2010/0222141 A1 | 9/2010 | Lasalvia |
| 2010/0227662 A1 | 9/2010 | Speer et al. |
| 2010/0227670 A1 | 9/2010 | Arezina et al. |
| 2010/0227671 A1 | 9/2010 | Laaroussi |
| 2010/0227687 A1 | 9/2010 | Speer et al. |
| 2010/0234091 A1 | 9/2010 | Baerlocher et al. |
| 2010/0240399 A1 | 9/2010 | Roumeliotis |
| 2010/0279764 A1 | 11/2010 | Allen et al. |
| 2010/0298040 A1 | 11/2010 | Joshi |
| 2010/0317435 A1 | 12/2010 | Velu |
| 2010/0323780 A1 | 12/2010 | Acres |
| 2010/0325703 A1 | 12/2010 | Etchegoyen |
| 2011/0009181 A1 | 1/2011 | Speer et al. |
| 2011/0039615 A1 | 2/2011 | Acres |
| 2011/0053679 A1 | 3/2011 | Canterbury et al. |
| 2011/0065492 A1 | 3/2011 | Acres |
| 2011/0076941 A1 | 3/2011 | Taveau |
| 2011/0086696 A1 | 4/2011 | MacEwan |
| 2011/0105208 A1 | 5/2011 | Bickley |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0161912 A1* | 6/2011 | Eteminan ............ G06F 8/34 717/124 |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0244952 A1 | 10/2011 | Schueller |
| 2011/0263318 A1 | 10/2011 | Agarwal et al. |
| 2011/0269548 A1 | 11/2011 | Barclay et al. |
| 2011/0306400 A1 | 12/2011 | Nguyen |
| 2011/0306426 A1 | 12/2011 | Novak et al. |
| 2011/0307547 A1 | 12/2011 | Backer |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0185398 A1 | 7/2012 | Weis |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0315981 A1 | 12/2012 | Gagner |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0103965 A1 | 4/2013 | Golembeski |
| 2013/0104193 A1 | 4/2013 | Gatto et al. |
| 2013/0130766 A1 | 5/2013 | Harris et al. |
| 2013/0132745 A1 | 5/2013 | Schoening et al. |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0281187 A1 | 10/2013 | Skelton |
| 2013/0281188 A1 | 10/2013 | Guinn |
| 2013/0316808 A1 | 11/2013 | Nelson |
| 2013/0337878 A1 | 12/2013 | Shepherd |
| 2013/0337889 A1 | 12/2013 | Gagner |
| 2014/0006129 A1 | 1/2014 | Heath |
| 2014/0057716 A1 | 2/2014 | Massing et al. |

(56) References Cited

U.S. PATENT DOCUMENTS

| | | |
|---|---|---|
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 8/2015 | Phegade |
| 2016/0125695 A1 | 5/2016 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0243440 A1 | 8/2017 | Nguyen |
| 2017/0337770 A1 | 11/2017 | Nguyen |
| 2018/0144581 A1 | 5/2018 | Nguyen |
| 2019/0005773 A1 | 1/2019 | Nguyen |
| 2019/0122490 A1 | 4/2019 | Nguyen |
| 2019/0122492 A1 | 4/2019 | Nguyen |
| 2019/0213829 A1 | 7/2019 | Nguyen |
| 2020/0372753 A1 | 11/2020 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Advisory Action for U.S. Appl. No. 14/189,948, dated Jul. 28, 2017.
Final OA for U.S. Appl. No. 13/801,256, dated Aug. 15, 2014.
Final OA for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/801,256, dated Aug. 18, 2017.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Benston, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.

(56) References Cited

OTHER PUBLICATIONS

Final Office Action for U.S. Appl. No. 13/801,171, dated Dec. 13, 2017.
Final Office Action for U.S. Appl. No. 15/271,488, dated Dec. 21, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 16/162,358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448 dated Oct. 12, 2019.
Notice of Allowance for U.S. Appl. No. 15/495,975, dated Oct. 23, 2019.
Notice of Allowance for U.S. Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 16/190,050, dated Jun. 1, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/219,940, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.
Office Action for U.S. Appl. No. 16/600,395, dated Dec. 22, 2020.
"Professional Casino Slot Machine", Posted at www.vbtutor.net/VB.Sample/vbslot2.htm on Oct. 20, 2009.
Final Office Action for U.S. Appl. No. 16/559,553, dated Jan. 21, 2021.
Final Office Action for U.S. Appl. No. 16/449,717, dated Jan. 29, 2021.
Notice of Allowance for U.S. Appl. No. 15/811,654, dated Feb. 3, 2021.
Notice of Allowance for U.S. Appl. No. 14/017,150, dated Feb. 5, 2021.
Advisory Action for U.S. Appl. No. 13/632,828, dated Feb. 25, 2016.

(56) References Cited

OTHER PUBLICATIONS

IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.

(56) References Cited

OTHER PUBLICATIONS

Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.

\* cited by examiner

SPONTANEOUS PLAYER PREFERENCES

CROSS-REFERENCE TO RELATED APPLICATION

This application is a continuation of U.S. application Ser. No. 14/189,948, filed Feb. 25, 2014, entitled "SPONTANEOUS PLAYER PREFERENCES," which is a continuation of U.S. application Ser. No. 12/757,968, filed Apr. 9, 2010, entitled "SPONTANEOUS PLAYER PREFERENCES," and which are all hereby incorporated by reference herein in its entirety for all purposes.

BACKGROUND OF THE INVENTION

Electronic gaming devices such as slot machines, videos poker machines, and keno machines account for almost 70% of the revenue generated by a casino. There are numerous gaming themes that are in casinos and in development as manufacturers compete for floor space. Recent architectural migration to server-assisted and server-based gaming platforms further fuel the game volume rise. As these trends continue, players will be bombarded by a bewildering array of gaming choices. Many casinos collect and store a player's gaming preferences from each gaming session which are used to predict similar games that may interest the player based on past gaming preferences history. However, the player's gaming preferences may be stale as a player's preference today may be different that yesterday or three weeks ago.

A primary objective of a casino is to entice players to play for longer time periods. A personalized gaming experience may compel players to extend gaming sessions; however, as stated above player preferences are often not static at a given place, on a given day, or even during a gaming session. Past gaming preferences history may poorly predict the manner in which player preferences change during a gaming session.

Overview

A system, method, and apparatus capable of collecting player's spontaneous choices and environmental data used to create and update spontaneous player profiles is discussed. In one embodiment, a portable electronic device comprises at least one sensor configured to acquire at least one interest data based on at least one user action, the at least one user action being used to initiate acquisition of data associated with the at least one interest data, the at least one interest data associated with at least one gaming establishment offering and presented throughout the gaming establishment; a processor operative with an interest data application; and a memory configured to store the at least one interest data and the interest data application; wherein the interest data application saves the plurality of interest data to the memory, and wherein the acquired data includes location data associated with a position of the portable electronic device.

A player preference system may have at least one portable electronic device having at least one sensor configured to acquire a plurality of interest data based on at least one user action, the at least one user action being used to initiate acquisition of data associated with the plurality of interest data, the plurality of interest data associated with at least one gaming establishment offering presented throughout the gaming establishment, the at least one portable electronic device including: a processor operative with an interest data application to acquire the plurality of interest data; and a memory configured to store the plurality of interest data and the interest data application, wherein the acquired data includes location data associated with a position of the portable electronic device. They system may also have a gaming machine configured to communicate with the at least one portable electronic device to receive the plurality of interest data, the gaming machine having a display configured to present at least one user interest offering based on the plurality of interest data; and a gaming server configured to communicate with the at least one portable electronic device and the gaming machine, the gaming server configured to evaluate the plurality of interest data to determine the at least one user interest offering presented on the gaming machine.

A method for presenting at least one user interest offering on a display of a gaming device may comprise acquiring one or more spontaneous interest data based on at least one user action, the at least one user action being used to initiate acquisition of data associated with the at least one spontaneous interest data, the data being associated with at least one gaming establishment offering and located within a gaming establishment; identifying a location data based on the acquired data; identifying at least one user interest offering based on the spontaneous interest data; storing the spontaneous interest data and location data; and displaying the identified at least one user interest offering on the display of the gaming device.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Figure 1A:
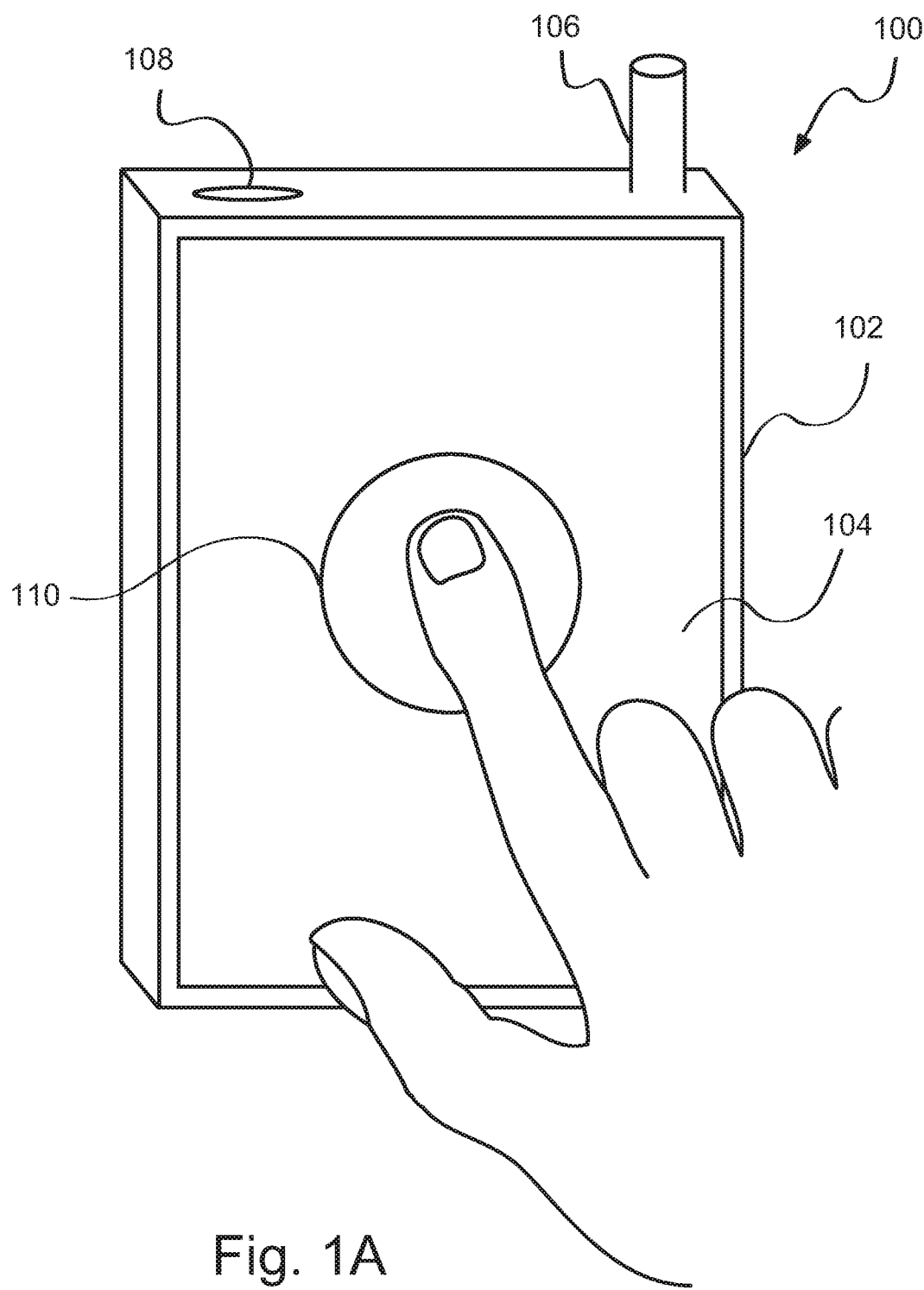
FIG. 1A is a front view of an example of a portable electronic device.

Embodiments are described herein in the context of a Spontaneous Player Preferences. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A system, method, and apparatus capable of collecting environmental data used to create and update spontaneous player profiles is discussed. In one embodiment, a portable electronic device runs a spontaneous interest data application that allows a player to collect a plurality of spontaneous interest data from the surrounding environment. The spontaneous interest data may represent various features of the environment such as audio and visual data as well as non-audiovisual data for example date, time and temperature. The spontaneous interest data may include location data associated with the position of the portable electronic device. The spontaneous interest data may also include player-acquired-data such as preferred games, and preferred game features, for example jackpots, bonuses, and the like. The spontaneous interest data may also include player-acquired-data such as preferred shows, food and beverages, tours, current and future promotions, and the like. The spontaneous interest data can then be evaluated to determine at least one game offering that may be tailored to the player's real time interests based upon the features of the environment. The evaluated spontaneous interest data may also determine at least one player interest offering. The player interest offering may reflect non-gaming preferences for example: dining, entertainment, casino comps, and the like.

A spontaneous player preferences system may allow a gaming establishment to create detailed player preferences generated through a player's interaction with the gaming establishment environment. This system may provide the gaming establishment an opportunity to monitor player preferences in real time and generate both game and interest offerings tailored to the player's real time desires. The spontaneous player preferences system may also be augmented by historical preference data. Such a system could allow the gaming establishment to more precisely market services and amenities to players. In another embodiment, the plurality of interest data may be evaluated to determine at least one game and at least one player interest offering. These offerings could then be presented to at least one gaming device or a gaming machine for use by the player. A gaming device is used interchangeably with gaming machine here, and refers to the well-known slot machine or a table game, but can also include non-traditional platforms such as a smart phone, a laptop computer, an interactive TV, a kiosk, and the like. A more centralized player preferences system could also allow the plurality of spontaneous interest data to be accumulated and retained by the gaming establishment.

Figure 1B:
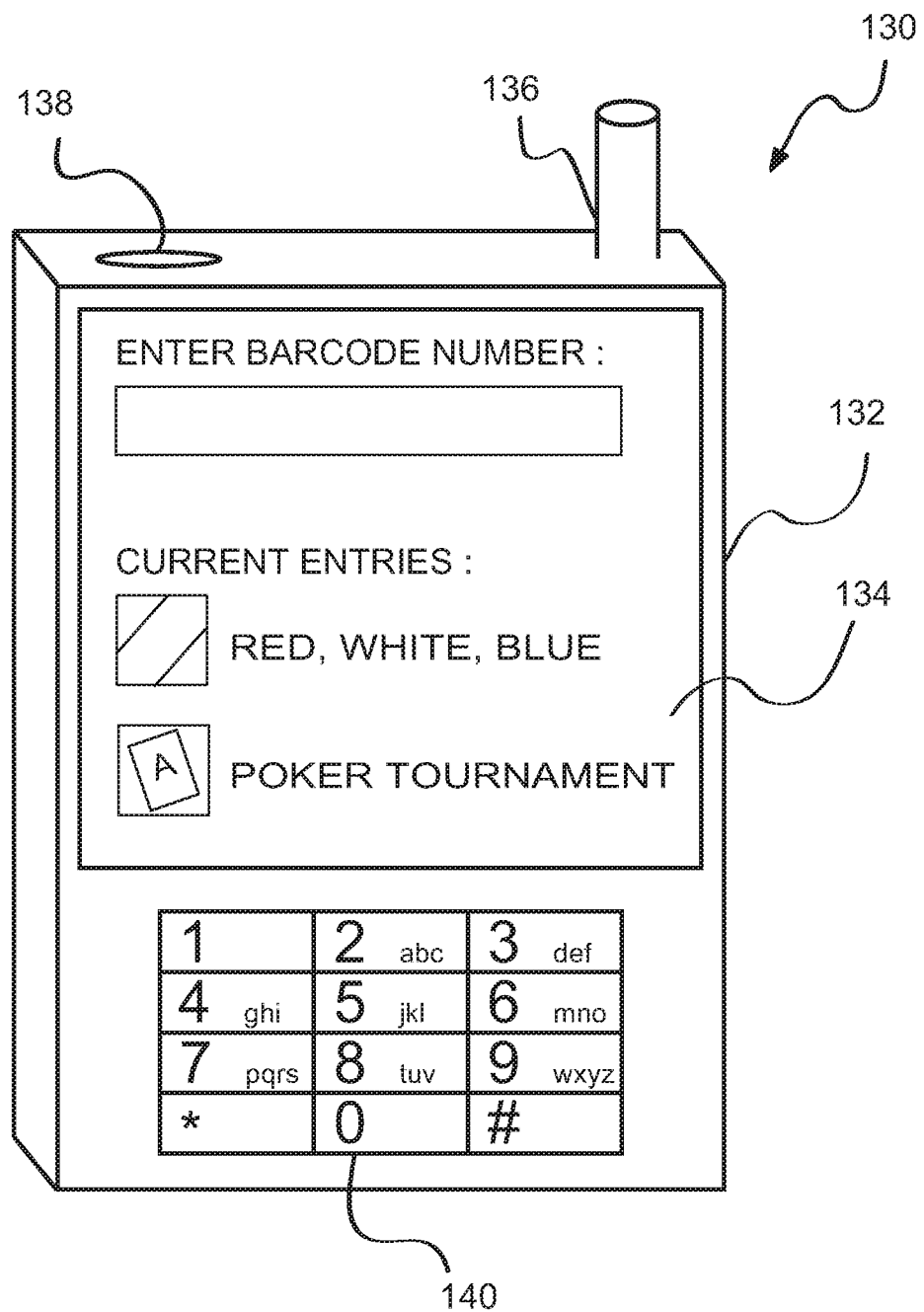
FIG. 1B is a front view of another embodiment of a portable electronic device running a spontaneous interest data application.

Referring to FIGS. 1A and 1B, one embodiment of a portable electronic device that may be operative to acquire a plurality of spontaneous interest data will be described. FIG. 1A is a front view of an example of a portable electronic device. The portable electronic device 100 includes a housing 102 that contains at least a processor 202 (FIG. 2) operative with a spontaneous interest data application to acquire a plurality of spontaneous interest data, a memory 204 (FIG. 2) configured to store the spontaneous interest data application and the spontaneous interest data, and a data transfer interface 106 configured to transfer the plurality of spontaneous interest data to another device.

In one embodiment, the housing 102 further includes an input device 108 configured to receive the spontaneous interest data. As the spontaneous interest data may include environmental data, the input device 108 can be, but is not limited to, a microphone to collect audio data, a camera to collect visual data, a touch screen 112 to collect player input, an indoor radio frequency (RF) based locationing system, for example WiFi, WiMax, BlueTooth, Wireless Universal Serial Bus (USB), and the like, and an outdoor locationing system, for example global positioning system (GPS), WiMax, LTE, or cell-tower based, transceiver to collect position or location data associated with the portable electronic device 100, or any combination of the proceeding. In another embodiment, the input device 108 may further comprise a motion sensor, for example an accelerometer, and/or an orientation sensor, for example a gyroscope, operative to sense at least one user action. For example, the motion sensor may detect a positional change of the portable electronic device 100 initiated by a user. The positional change of the portable electronic device may correspond to the at least one user action sensed by the spontaneous interest data application during acquisition of a plurality of spontaneous interest data. For example, if the user would like to hear ambient music or songs a band is playing, the user may shake the portable electronic device 100. The motion sensor may detect the positional change and start recording the audio data. A second shake of the portable electronic device 100 may signal the portable electronic device 100 to stop recording the audio data. Any recorded music and similar environmental sounds may be later evaluated, transcribed and transmitted to the player's gaming device. For example, a partial sample of a song can be interpreted as a music genre that the player likes at the moment. In another example the input device 108 may further comprise controls created by the spontaneous interest data application. For example, the spontaneous interest data application may generate a user interface to allow the user to interact with the spontaneous interest data application via configurable buttons displayed by the user interface. Through the user interface, the user may accept or delete user-acquired spontaneous interest data by actuating buttons labeled "Add" or "Del" displayed by the user interface.

The audio environmental data may include, but is not limited to, ambient music, conversations, and ambient crowd sounds. The visual environmental data may include, but is not limited to, pictures of gaming machines, background sceneries and other features of the gaming establishment and pictures of or data derived from scanned unique barcodes that may be associated with a plurality of objects within the gaming establishment environment. These objects may include, but are not limited to gaming machines, table games, posters, restaurant menus, entertainment show playbills, and the like. For example, the barcode may be encoded in a 2D datamatrix format.

Indoor position or location data associated with the portable electronic device 100 may be derived from an RF transceiver inside housing 102, and position data may also be calculated using various means. For example, position data associated with the portable electronic device 100 may be calculated using an RF wireless location tracking between the portable electronic device and at least one wireless access point distributed throughout the gaming establishment environment. In one embodiment, an RF transceiver within portable electronic device 100 may be located by its position relative to the closest access point. In another embodiment, triangulation or trilateration methods may be used in conjunction with multiple stationary access points to determine the location of portable electronic device 100. In another example, RF fingerprinting location appliances, for example, the Cisco Wireless Location Appliance manufactured by Cisco Systems, Inc. (San Jose, Calif., US), may be used to determine the location of the portable electronic device 100. RF fingerprinting may further refine the position data associated with portable electronic device 100 by comparing the live-captured RF characteristic of the current location of the portable electronic device 100 to a known or predicted RF characteristic of a point or zone within the gaming establishment environment. In still another example, location data may be determined visually by a plurality of smart cameras distributed throughout the gaming establishment environment. The smart cameras may recognize the portable electronic device 100 and triangulate its position within the gaming establishment environment based on known location data of nearby fixed objects.

The portable electronic device 100 may also have a data transfer interface 106 configured to communicate with the spontaneous interest data application and operative to transfer the plurality of spontaneous interest data to another device. Although illustrated in FIG. 1A as a wireless interface, it can also be wired connection such as a docking device for direct communication. The data transfer interface 106 may transfer the spontaneous interest data to a gaming machine, a gaming server, or any other device configured to receive the spontaneous interest data.

The portable electronic device 100 may have a display 104. In one embodiment, display 104 may include a touch screen capable of sensing at least one user action. A user may initiate the spontaneous interest data application to collect the spontaneous interest data by actuating or touching an application-created button 110.

FIG. 1B is a front view of another embodiment of a portable electronic device running a spontaneous interest data application. The portable electronic device 130 may include a housing 132 that may contain a processor operative with a spontaneous interest data application configured to acquire a plurality of spontaneous interest data as described above. The portable electronic device 130 may also contain a memory 204 (FIG. 2) and a data transfer interface 136 as described above. A display 134 may be used to present the spontaneous interest data application to a user to begin and/or end the spontaneous interest data application as well as obtain or enter spontaneous interest data. The spontaneous interest data application may allow user-directed acquisition of a plurality of spontaneous interest data based on at least one user action. For example, the user may manually enter, using a keypad 140, barcode numbers associated with a preferred gaming feature, such as a poker tournament the player would like to register for. In another example, the spontaneous interest data application may allow the user to obtain spontaneous interest data using an input device 138.

As the spontaneous interest data may include environmental data, the input device 138 can be, but is not limited to, a microphone to collect audio data, a camera to collect visual data, and a RF transceiver to collect position data associated with the portable electronic device. The environmental data that may be collected by the input device may comprise audio, visual, date, time, temperature, and location data. Additionally, the spontaneous interest data may also include player-acquired-data such as preferred games, and preferred game features, for example jackpots, bonuses, and the like. The spontaneous interest data may also include player-acquired-data such as preferred shows, food and beverages, tours, current and future promotions, and the like.

The portable electronic device 130 may also include a data transfer interface 136 configured to transfer the collected spontaneous interest data to a gaming machine, gaming server, or any other device configured to receive the collected spontaneous interest data. Although illustrated in FIG. 1B as a wireless interface, the data transfer interface can also be a wired connection such as a docking device for direct communication.

Figure 1C:
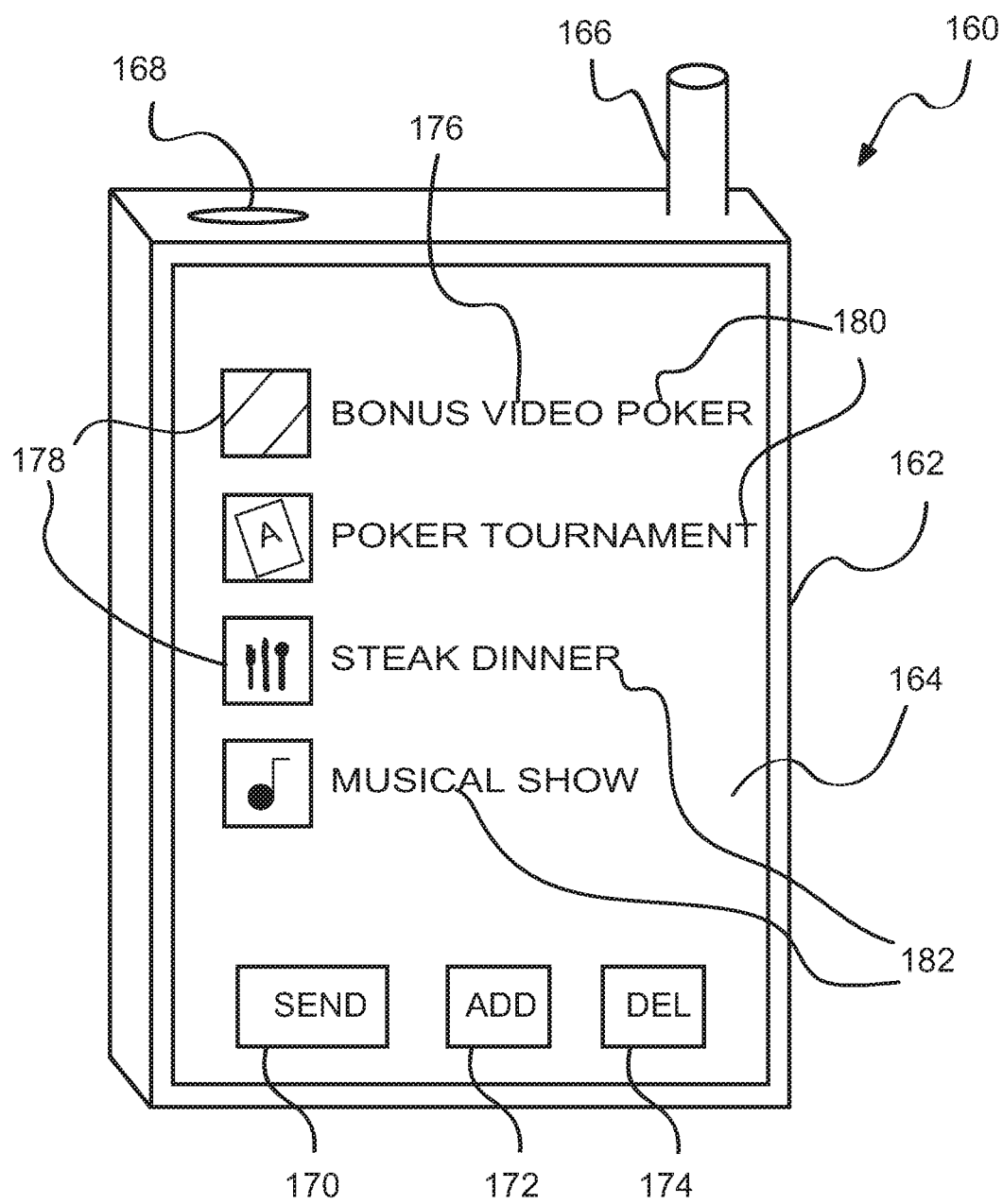
FIG. 1C is a front view of still another embodiment of a portable electronic device running a spontaneous interest data application.

FIG. 1C is a front view of still another embodiment of a portable electronic device running a spontaneous interest data application. The portable electronic device 160 may include a housing 162, and a processor 202 (FIG. 2) operative with a spontaneous interest data application configured to acquire a plurality of spontaneous interest data. The portable electronic device 160 may also have a memory 204 (FIG. 2) and a data transfer interface 166. A display 164 may be used to present and receive player inputs related to the spontaneous interest data application.

The portable electronic device 160 may also include an input device 168 configured to receive spontaneous interest data. As the spontaneous interest data may include environmental data, the input device 168 can be, but is not limited to, a microphone to collect audio data, a camera to collect visual data, and a RF transceiver to collect position data associated with the portable electronic device. The environmental data that may be collected by the input device may comprise audio, visual, date, time, temperature, and location data. Additionally, the spontaneous interest data may further include player-acquired-data such as preferred games, and preferred game features, for example jackpots, bonuses, and the like. The spontaneous interest data may also include player-acquired-data such as preferred shows, food and beverages, tours, current and future promotions, and the like. A data transfer interface 166 may be configured to transfer the collected spontaneous interest data to another device, such as a gaming machine, gaming server, or any other device configured to receive the spontaneous interest data.

Although illustrated in FIG. 1C as a wireless interface, the data transfer interface 166 can also be a wired connection such as a docking device for direct communication.

The spontaneous interest data application may be configured to evaluate the collected spontaneous interest data. The evaluation can be conducted at the portable electronic device, or can be processed at a remote server, or some combinations of both. Local evaluation at the portable electronic device can alleviate the data traffic on the network, improving response time. Remote evaluation at a server gives the application more processing power for analysis of sounds, sight, data, and better access to databases of available offerings. In the hybrid approach, some simple pre-processing, such as time and location determination, is done at the portable electronic device, while computational intensive analysis of the spontaneous preference data, such as image processing and pattern recognition, is conducted at the remote server. The pre-processing evaluation may comprise the steps of fetching the information associated with the acquired data, accumulating the information, reducing the information such as formatting the information and eliminating redundant information, and forward the pre-processed information to the evaluating device. For example, the player may acquire the code for a slot game. The portable electronic device may recognize that the data is associated with a slot game, fetches the game ID and game genre associated with that slot game, fetches promotional discounts available for any similar games at that location, available during that period of promotion, accumulates the acquired data and pre-fetched information, eliminates redundant data, and forwards the pre-processed data and information to a remote server.

A graphical interface 176 may be used to present the evaluated spontaneous interest data on display 164. At least one game offering 180 and at least one user interest offering 182 may be presented to the player. The at least one game offering 180 may represent gaming device recommendations derived from the evaluated spontaneous interest data. For example, the evaluated spontaneous interest data may indicate that the player, on a particular night, would most likely prefer to play a video poker game on a slot machine. Consequently, this game offering 180 may appear at the top of the recommended game offerings 180 designated "BONUS VIDEO POKER" (FIG. 1C). This same evaluated spontaneous interest dataset may also indicate that the player, on a particular night, would also prefer to enter a poker tournament. The corresponding game offering 180 designated "POKER TOURNAMENT" could appear below the most recommended game offering 180, "BONUS VIDEO POKER" (FIG. 1C). In another example, the spontaneous interest data may indicate that the player would like to play a spinning reel slot machine with a wheel-bonus feature. The game offering 180 may designate "SUPER HOT WHEEL BONUS" game, and also may suggest a group version of the bonus-wheel game called "RED HOT GROUP BONUS WHEEL."

Similarly, the at least one user interest offering 182 may represent non-gaming recommendations for dining, entertainment, casino comps, and the like derived from the evaluated spontaneous interest data. For example, the evaluated spontaneous interest data may indicate that the player, on a particular night, would most likely prefer to dine at a steak restaurant and see a musical show. Consequently, a "STEAK DINNER" user interest offering 182 may appear at the top of a recommended user interest offering list, and a "MUSICAL SHOW" user interest offering 182 may appear below the "STEAK DINNER" user interest offering 182 (FIG. 1C).

In one embodiment, the spontaneous interest data may be prioritized to determine the at least one game offering 180 and at least one user interest offering 182. For example, a portable electronic device, a gaming server, or a gaming machine, may receive a plurality of spontaneous interest data. The device that received the plurality of spontaneous interest data may evaluate and prioritize the plurality of spontaneous interest data by utilizing statistical data involving the number of times a particular spontaneous interest data may have been acquired by the portable electronic device 100 and the current availability of the at least one game offering and the at least one user interest offering. Alternatively, promotional products, for example game credit voucher, coupons, hats, t-shirts, tote bags, shot glasses, and the like may be given priority. After evaluating and prioritizing the plurality of spontaneous interest data, at least one game offering and at least one user interest offering may be determined for the user. A user interface may be presented on the gaming machine to display the at least one game offering and at least one user interest offering. The at least one game offering and at least one user interest offering may be a single recommended game offering and user interest offering, or the at least one game offering and at least one user interest offering could be a plurality of game offerings and user interest offerings. Each game offering and each user interest offering may be designated by an icon 178 depicting the respective game offering or user interest offering.

In this embodiment, the player may be able to further tailor the at least one game offering 180 and the at least one user interest offering 182. The player may select an "Add" button 172 or a "Del" button 174 to add or delete the at least one game offering 180 or the at least one user interest offering 182. The user may scroll through and select any of the offerings presented. The user may also select the transfer button 174 to transfer the spontaneous interest data, at least one game offering, and their at least one user interest offering to another device via the data transfer interface 166.

The at least one game offering and/or the at least one user interest offering may not be a one-time offering. Preferably, the at least one game offering and/or the at least one user interest offering is updated periodically as long as the player remains within the casino environment and invokes or re-invokes the spontaneous interest data application. For example, when a player leaves an activity to engage in another such as leaving a slot machine to go to a blackjack table, new at least one game offering and/or at least one user interest offering of related games can be presented. For example, poker, Paigow, roulette, and the like may be offered if a player may enter another area of the casino environment. As another example, the player can request another set of at least one game offering and/or at least one user interest offerings if the original at least one game offering and/or at least one user interest offerings are undesired.

Figure 2:
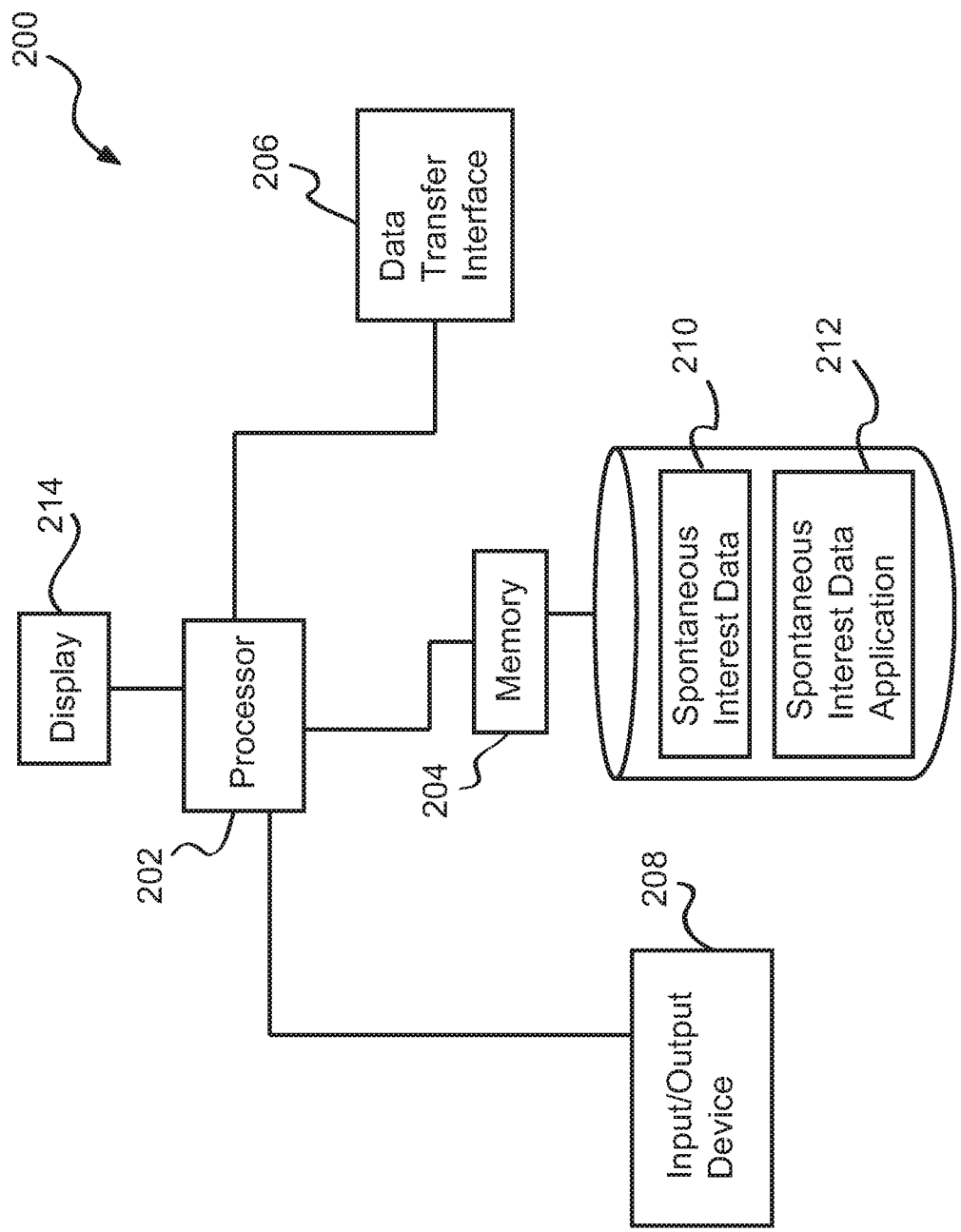
FIG. 2 is a block diagram of one embodiment of the portable electronic device.

FIG. 2 is a block diagram of one embodiment of the portable electronic device. Portable electronic device 200 may have at least one processor 202, a memory 204, a data transfer interface 206, and an input device 208. The memory 204 may be configured to communicate with the processor 202 and may store a plurality of spontaneous interest data 210 and/or a spontaneous interest data application 212. The spontaneous interest data application can be operative with the processor 202 to acquire the plurality of spontaneous interest data 210. The spontaneous interest data may comprise audio, visual, location, or any other data. The spontaneous interest data may be collected via an input/output device 208. The input/output device 208 may be, but is not limited to, a microphone, a video camera, a touch screen, a still image camera, a RF transceiver, a button, a motion sensor, a gyroscope, a headphone, an audiovisual (AV) port, a wired/wireless communication port, or any other device. The input/output device 208 may be configured to communicate with the processor 202 and controlled by the spontaneous interest data application 212. The portable electronic device 200 may also include a data transfer interface 206 operative to transfer the spontaneous interest data 210 to another device via a wired or wireless interface. The spontaneous interest data application may be configured to present a graphical user interface on a display 214 to allow a user to manipulate and/or view the spontaneous interest data. The display 214 may be any type of display such as a liquid crystal display (LCD), or the like.

Figure 3:
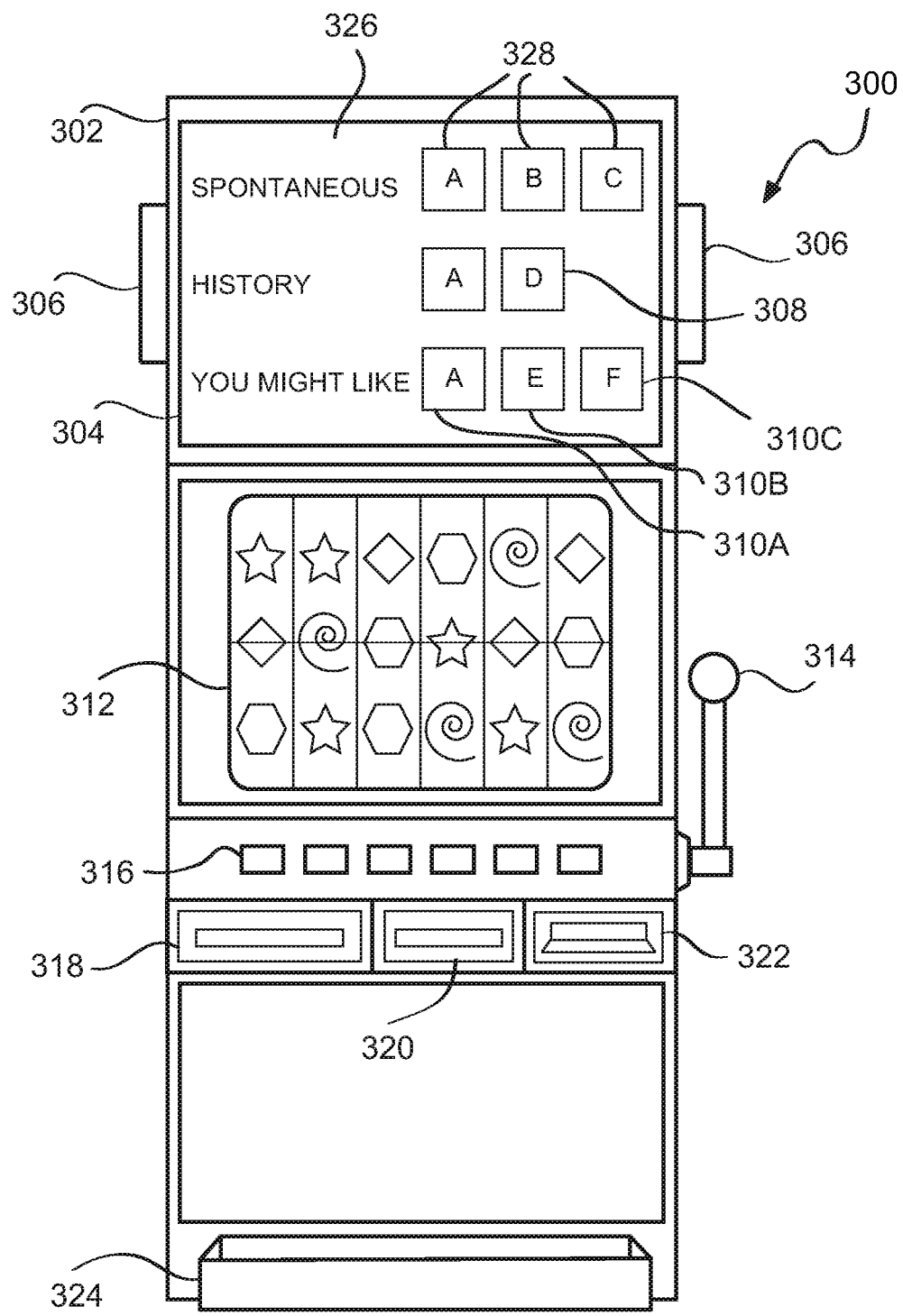
FIG. 3 illustrates a front view of an example gaming machine.

FIG. 3 illustrates a front view of an example gaming machine. Although the example gaming machine is illustrated as a slot machine, this is not intended to be limiting as the gaming machine may be a slot machine, mobile gaming device, gaming table, blackjack table, roulette table, kiosk, interactive TV, tablet computer, or the like. A gaming machine 300 may have a main display 312. The main display 312 may display any type of primary game of chance upon receipt of a wager from a player. For example, the main display 312 may display reel-based slot games, video poker, video blackjack, lottery games, or any other games of chance. In other embodiments, the main display 312 may display other types of text and graphics, including videos, pay tables, advertisements, secondary games, bonus games, player tracking information, announcements, or any other type of text and graphic.

The gaming machine 300 may have a player interface to play the primary game of chance. In one embodiment, the player interface may include any type of actuating device such as buttons 316 or a lever 314. In another embodiment, the main display 312 may be the player interface. For example, the user interface may be a touch screen display configured to receive an input from the player. The player interface may be any type of input mechanism capable of allowing a player to select options, play the primary game of chance, play a bonus game, or enter any other player input. For example, pushing a button 316 or pulling a lever 314 may prompt the gaming machine 300 to begin a spin of a reel in a slot game to play a primary game of chance. In another example, a player may use the touch screen display to enter player account information. The gaming machine 300 may also have speakers 306, lights, or other output devices.

The gaming machine 300 may also have a TITO (Ticket In, Ticket Out) system. TITO uses tickets encoded with monetary amounts, which can be converted into credits to be played in the gaming machine 300 when inserted into the gaming machine 300. The gaming machine 300 may have a bill acceptor 322 configured to receive the tickets. The gaming machine 300 may also have a ticket printer 318 configured to print out similar tickets encoded with the amount of credits remaining on the gaming machine 300 when the player desires to no longer play the gaming machine 300 and cash out.

The bill acceptor 322 may also be configured to receive currency, for example paper bills. The gaming machine 300 may also have a mechanism to accept currency in other forms such as coins, vouchers, smart cards, electronic funds, and the like. The currency can then be converted into credits to be played on the gaming machine 300. The gaming machine 300 may have a credit dispenser 324 where the credits on the gaming machine 300 can be cashed out when the player desires to no longer play the gaming machine 300.

The gaming machine 300 may have a player tracking device 320 configured to receive a player loyalty card. Casinos may issue players a player loyalty card for player tracking and rewarding purposes. The player loyalty card may be associated with a player account. Player account data may be stored on a network server, which may be on a network database server configured to communicate with the gaming machines in the casino. The network may be a client-server network, a peer-to-peer network, a wired or wireless network, a wide area network (WAN), a local area network (LAN), or any other type of network. The player may insert his or her player loyalty card into the player tracking device 320 to log into the player's account. Data about the player's play, such as outcomes, bet amounts, time played, or any other type of information, may be saved over the network to a non-volatile memory at a player tracking server or any other network server.

The gaming machine 300 can have a secondary display 304 that may display a user interface 326. The secondary display 304 may also display other text and graphics, including videos, pay tables, advertisements, secondary games, bonus games, player tracking information, announcements, or any other type of text and graphic. The secondary display 304 can potentially display any type of game of chance such as reel-based slot games, video poker, video blackjack, lottery games, secondary games of chance or any other type of known games of chance. The secondary display 304 can be a liquid crystal display screen, cathode ray tube monitor, projection, organic light-emitting diode screen or any other type of display device.

The user interface 326 may present a plurality of spontaneous interest data items 306. The user interface 326 may group the plurality of spontaneous interest data items 306 by subset types. The subset types of the plurality of spontaneous interest data items 306 may include, but is not limited to, history items 308, game offerings 310A, user interest offerings 310B, entertainment offerings 310C, tournament offerings, and food and beverage offerings. Each subset type of the plurality of spontaneous interest data items 306 may be arranged horizontally, vertically, in an array, or in any other formation or alignment that may indicate a distinct grouping. Each subset type of the plurality of spontaneous interest data items 306 may be accompanied by additional text or graphics to indicate the subset type.

The plurality of spontaneous interest data items 306, that may be presented on the user interface 326, can be associated with or relate to different themes of gaming machines, tournaments, entertainment shows, food and dining, music, or any other activity or interest that the player may have preferences for. The plurality of spontaneous interest data items 306 may be represented by icons, symbols, pictures, text, and other such indicia, or any combination of the proceeding.

In one embodiment, the plurality of spontaneous interest data items 306 may be obtained from a plurality of spontaneous interest data acquired by a portable electronic device 100 as illustrated in FIGS. 1A-C. In another embodiment, the plurality of spontaneous interest data items 306 may be obtained from both the portable electronic device 100 and casino infrastructure such as, but not limited to, smart cameras or wireless location tracking of the portable electronic device. In another embodiment, the plurality of spontaneous interest data items 306 may be obtained from another device, such as a gaming server.

Although illustrated on the secondary display 304, this is not intended to be limiting as the plurality of spontaneous interest data items 306 may also be illustrated on the main display 312. The plurality of spontaneous interest data items 306 may be selected using the player interface of the gaming machine 300. In one embodiment, a user selection can prompt the gaming machine 300 to initiate a primary game of chance corresponding to the selected spontaneous interest data item. In another embodiment, the user selection can prompt the ticket printer 318 to print show tickets corresponding to the selected spontaneous interest data item. In still another embodiment, the user selection can prompt the primary display 312 or the secondary display 304 to display a restaurant menu corresponding to the selected spontaneous interest data item.

Figure 4:
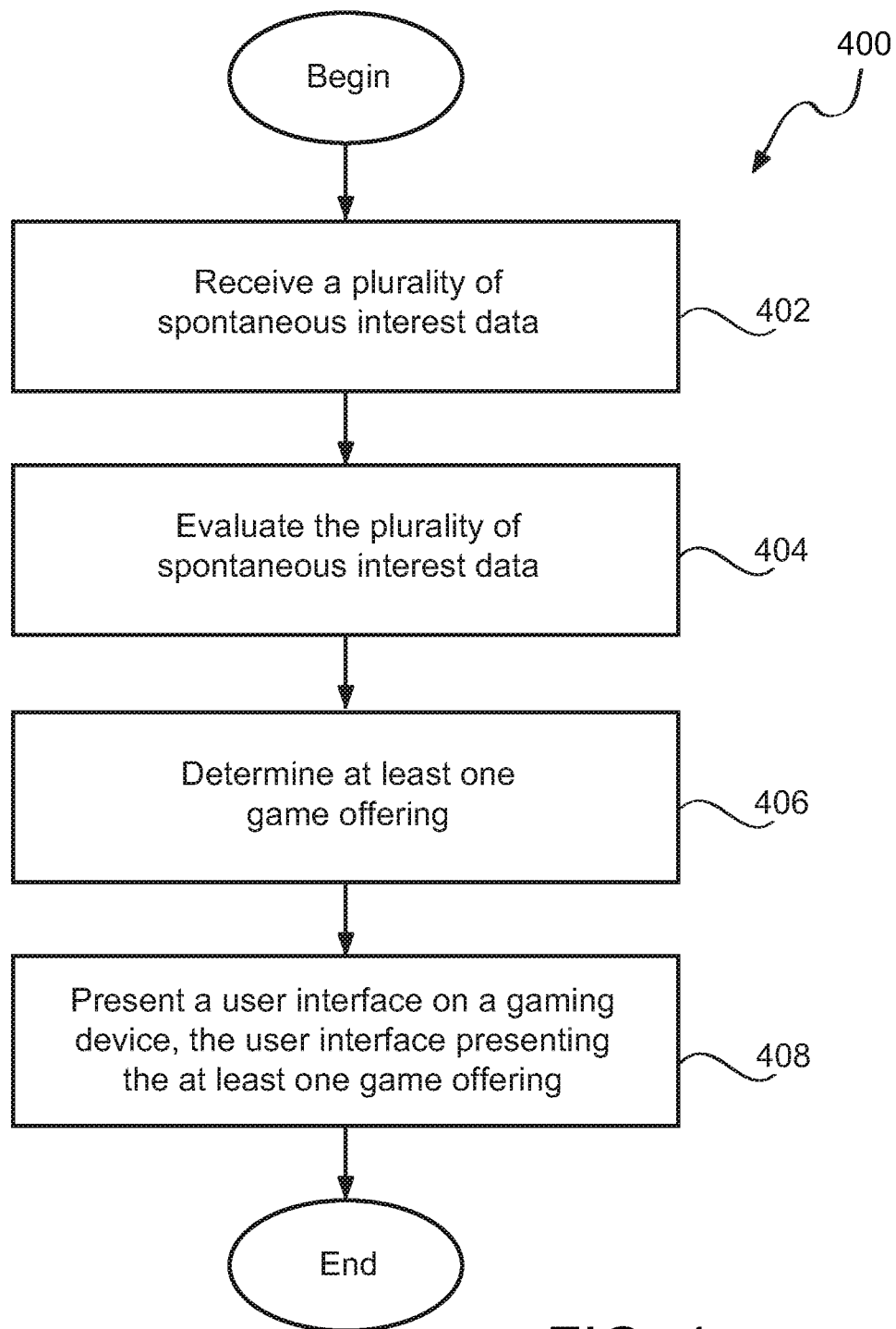
FIG. 4 illustrates a flow diagram of an example method for presenting game offerings.

FIG. 4 illustrates a flow diagram of an example method for presenting game offerings. The method for presenting game offerings 400 may begin by receiving a plurality of spontaneous interest data acquired from a portable electronic device and transferred to another device, such as a gaming server, gaming machine, or any device configured to receive the plurality of spontaneous interest data 402. The plurality of spontaneous interest data may include location data associated with the portable electronic device 100.

The plurality of spontaneous interest data may then be evaluated 404. The evaluating 404 of the plurality of spontaneous interest data, in one embodiment, may be performed by the gaming server 704. The evaluating 404 of the plurality of spontaneous interest data, in another embodiment, may be performed by the gaming machine 300.

The plurality of spontaneous interest data may be evaluated and prioritized. In one example, the prioritizing may utilize statistical data involving the number of times particular spontaneous interest data may have been acquired by the portable electronic device 100 as well as supplemental factors such as the availability of a prioritized at least one game offering and/or the availability of a prioritized at least one user interest offering. The statistical data may also include length of time the user may have spent playing a particular game of chance, number of times the user may have attended a particular entertainment show, amount of money the user may have spent at a particular restaurant, popularity of a prioritized at least one game offering and/or the popularity of a prioritized at least one user interest offering with other players, number of times the user may have played a type of game, number of times a user took advantage of promotional offers, and other such statistical data that may indicate the user's priorities. In another embodiment, the prioritizing may be based on any available promotional offers, for example, an offer from the casino marketing department or a 3$^{rd}$ party sponsor. In another example, the prioritizing may utilize user indicated preferences. For example, the user may indicate current preferences through, but not limited to, a numerical rating system, an emoticon system, a thumbs up or down system or any other ranking system or method.

At least one game offering may be determined 406. The determination 406 of the at least one game offering may be performed by the gaming server, gaming machine, portable electronic device, or any other device. The determining 406 may further comprise determining a plurality of game offerings for the user. For example, if the evaluating 404 of the plurality of spontaneous interest data reveals a player's preference for nautically themed slot machine games, then the determining 406 may entail a sea themed game, a sailing themed game, a fishing themed game, and a pirate themed game rather than only the sea themed game. The determining 406 of the at least one game offering may also comprise determining at least one user interest offering based on the plurality of spontaneous interest data. For example, if the evaluating 404 of the plurality of spontaneous interest data reveals a player's interest in an Elvis themed slot machine game, the determining 406 may result in tickets for an Elvis impersonator music show.

A user interface may be presented on the gaming machine to display the at least one game offering 408. The at least one game offering may be a single recommended game offering or a plurality of game offerings.

Figure 5:
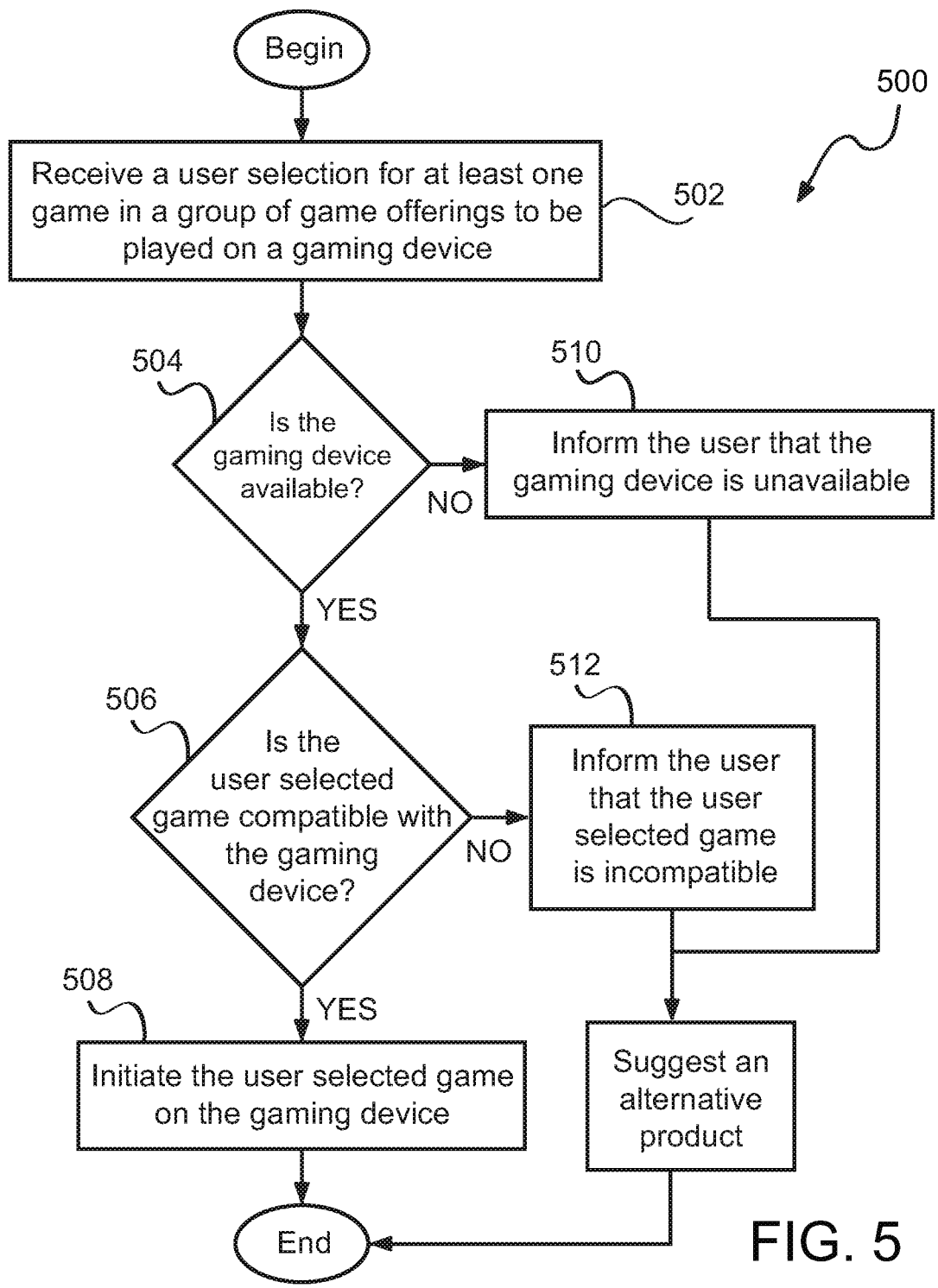
FIG. 5 illustrates a flow diagram of an example method for initiating a user selected game.

FIG. 5 illustrates a flow diagram of an example method for initiating a user selected game. The method of initiating a user selected game 500 can be performed, for example, on the gaming machine illustrated in FIG. 3.

A player selection for at least one game in a plurality of game offerings to be played on a gaming machine may be received at 502. The player selection may be made using a user interface such as buttons, touch screen display, voice, or any other mechanism, control, or method for interfacing with the gaming machine.

A determination of whether the gaming device is available at 504. The determination of whether the gaming device is available may be influenced by the player's current location. For example, if nearby gaming devices are occupied, the player-selected game product may not be allowed at the player's current location. In another example, other factors such as availability of game licenses may influence the determination of whether the gaming device is available.

If it is determined that the gaming machine is unavailable at 504, the player may be informed that the gaming machine is unavailable 510. In one embodiment, the player may be informed of the unavailability of the gaming machine via text, graphics, or any other visual notification on a portable electronic device. In another embodiment, the player may be informed of the unavailability of the gaming machine via an audio message, text message, sound, vibration alert, beep, or any other message on the portable electronic device. At 514, an alternative offering of a similar or related gaming machine is offered. The alternative offering may further comprise an offer to put the player on a waiting list at the current location, and/or a message estimating the availability of the next nearest time and location of the requested gaming machine.

If the gaming machine is available at 504, the compatibility of the player selected game with the gaming machine is verified at 506. If the player selected game is incompatible with the gaming machine at 506, the player may be informed that the player selected game is incompatible at 512. For example, the player selected game may have a progressive jackpot feature that may not be supported by any nearby game devices. In one embodiment, the player may be informed that the player selected game is incompatible via text, graphics, audio message, sound, vibration alert, beep or any other visual, tactile, or audio notification on a display of the portable electronic device or the gaming machine. At 514, an alternative offering of a similar or related gaming machine is offered. The alternative offering may further comprise an offer to put the player on a waiting list at the current location, and/or a message estimating the availability of the next nearest time and location of the requested gaming machine. If the user selected game and the gaming machine are compatible at 506, the user selected game may be initiated on the gaming machine at 508. In one embodiment, the user selected game may be requested and obtained from a gaming server and downloaded onto the gaming machine.

The at least one game offering and/or the at least one user interest offering may not be a one-time offering. Preferably, the at least one game offering and/or the at least one user interest offering is updated periodically as long as the player remains within the casino environment and invokes or re-invokes the spontaneous interest data application. For example, when a player leaves an activity to engage in another such as leaving a slot machine to go to a blackjack table, new at least one game offering and/or at least one user interest offering of related games can be presented. For example, poker, Paigow, roulette, and the like may be offered if a player may enter another area of the casino environment. As another example, the player can request another set of at least one game offering and/or at least one user interest offerings if the original at least one game offering and/or at least one user interest offerings are undesired.

Figure 6:
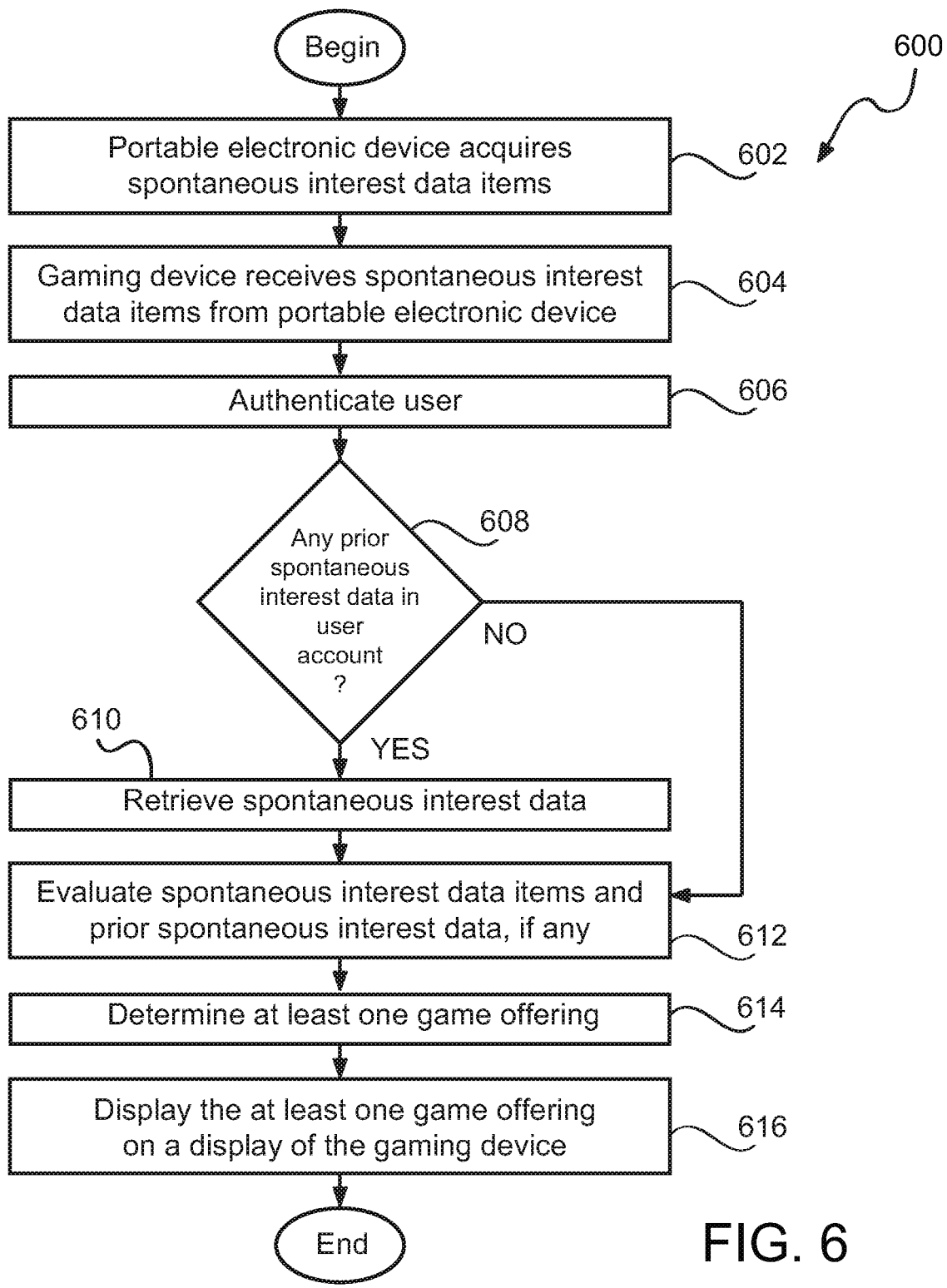
FIG. 6 illustrates a flow diagram of a method for displaying game offerings.

FIG. 6 illustrates a flow diagram of a method for displaying game offerings. The method for displaying game offerings 600 can be performed on a display of a portable electronic device, a gaming machine, or any other device.

The portable electronic device may acquire a plurality of spontaneous interest data at 602. The portable electronic device may acquire the plurality of spontaneous interest data via any means discussed above with reference to FIGS. 1A-C. The gaming device may receive the plurality of spontaneous interest data from the portable electronic device at 604. In one example, the user may initiate transfer of the plurality of spontaneous interest data from the portable electronic device to the gaming machine using a data transfer interface.

The user can be authenticated at 606. The authentication of the user 606 may involve authenticating the user, the spontaneous interest data application, the portable electronic device, or any combination of the proceeding. The user can be authenticated via the use of passwords, pin numbers, digital signatures, smartcards, portable electronic device unique identification, user phone number, biometric identification technologies, or any combination of the proceeding.

After the user is authenticated at 606, a determination made as to whether the user account has any prior spontaneous interest data at 608. If there is prior spontaneous interest data in the user account, the prior spontaneous interest data may be retrieved from database 710 at 610. The plurality of spontaneous interest data and the prior spontaneous interest data, if any, may be evaluated 612. The evaluating 612 of the plurality of spontaneous interest data and the prior spontaneous interest data, if any, in one embodiment, may be performed by the gaming server 704. The evaluating 612 of the plurality of spontaneous interest data and the prior spontaneous interest data, if any, in another embodiment, may be performed by the gaming machine 300, or in yet another embodiment, by the portable electronic device 130.

The plurality of spontaneous interest data and the prior spontaneous interest data, if any, may be evaluated and prioritized. In one example, the prioritizing may utilize statistical data involving the number of times particular prior spontaneous interest data may have been acquired by the portable electronic device 100, as well as supplemental factors, for example the availability of a gaming device. The statistical data may also include length of time the user may have spent playing a particular game of chance, number of times the user may have attended a particular entertainment show, amount of money the user may have spent at a particular restaurant, popularity of a gaming device with other players, number of times the user may have played a type of game, number of times a user accepted promotional offers, and other such statistical data that may indicate the user's priorities. In another embodiment, the prioritizing may be based on any available promotional offers, for example an offer from the casino marketing department, or a $3^{rd}$ party sponsor. In another example, the prioritizing may utilize user indicated preferences. For example, the user may indicate current preferences through, but not limited to, a numerical rating system, an emoticon system, a thumbs up or down system or any other ranking system or method.

After evaluating the plurality of spontaneous interest data and prior spontaneous interest data at 612, at least one game offering can be determined 614, and displayed on a display of a gaming machine at 616.

The determination 614 of the at least one game offering may be performed by the gaming server, gaming machine, portable electronic device, or any other device. The determining 614 may further comprise determining a group of game offerings for the user. For example, if the evaluating 612 of the plurality of spontaneous interest data and prior spontaneous interest data reveals a player's preference for nautically themed slot machine games, then the determining 614 may entail a sea themed game, a sailing themed game, a fishing themed game, and a pirate themed game rather than just the sea themed game. The determining 614 of the at least one game offering may also comprise determining at least one user interest offering based on the plurality of spontaneous interest data and prior spontaneous interest data. For example, if the evaluating 612 of the plurality of spontaneous interest data and prior spontaneous interest data reveals a player's interest in an Elvis themed slot machine game, the determining 614 may result in tickets for an Elvis impersonator show.

In one embodiment, the display of the at least one game offering on the display of the gaming machine 616 may present a user interface that may present the at least one game offering. The at least one game offering may be represented by icons, symbols, pictures, text, and other such indicia, or any combination of the proceeding on the display of the gaming machine. The at least one game offering may be arranged horizontally, vertically, in an array, or in any other formation or alignment that may indicate a distinct grouping. The at least one game offering may be accompanied by additional text or graphics to indicate the distinct grouping of the at least one game offerings.

The at least one game offering and/or the at least one user interest offering may not be a one-time offering. Preferably, the at least one game offering and/or the at least one user interest offering is updated periodically as long as the player remains within the casino environment and invokes or re-invokes the spontaneous interest data application. For example, when a player leaves an activity to engage in another such as leaving a slot machine to go to a blackjack table, new at least one game offering and/or at least one user interest offering of related games can be presented. For example, poker, Paigow, roulette, and the like may be offered if a player may enter another area of the casino environment. As another example, the player can request another set of at least one game offering and/or at least one user interest offerings if the original at least one game offering and/or at least one user interest offerings are undesired.

Figure 7:
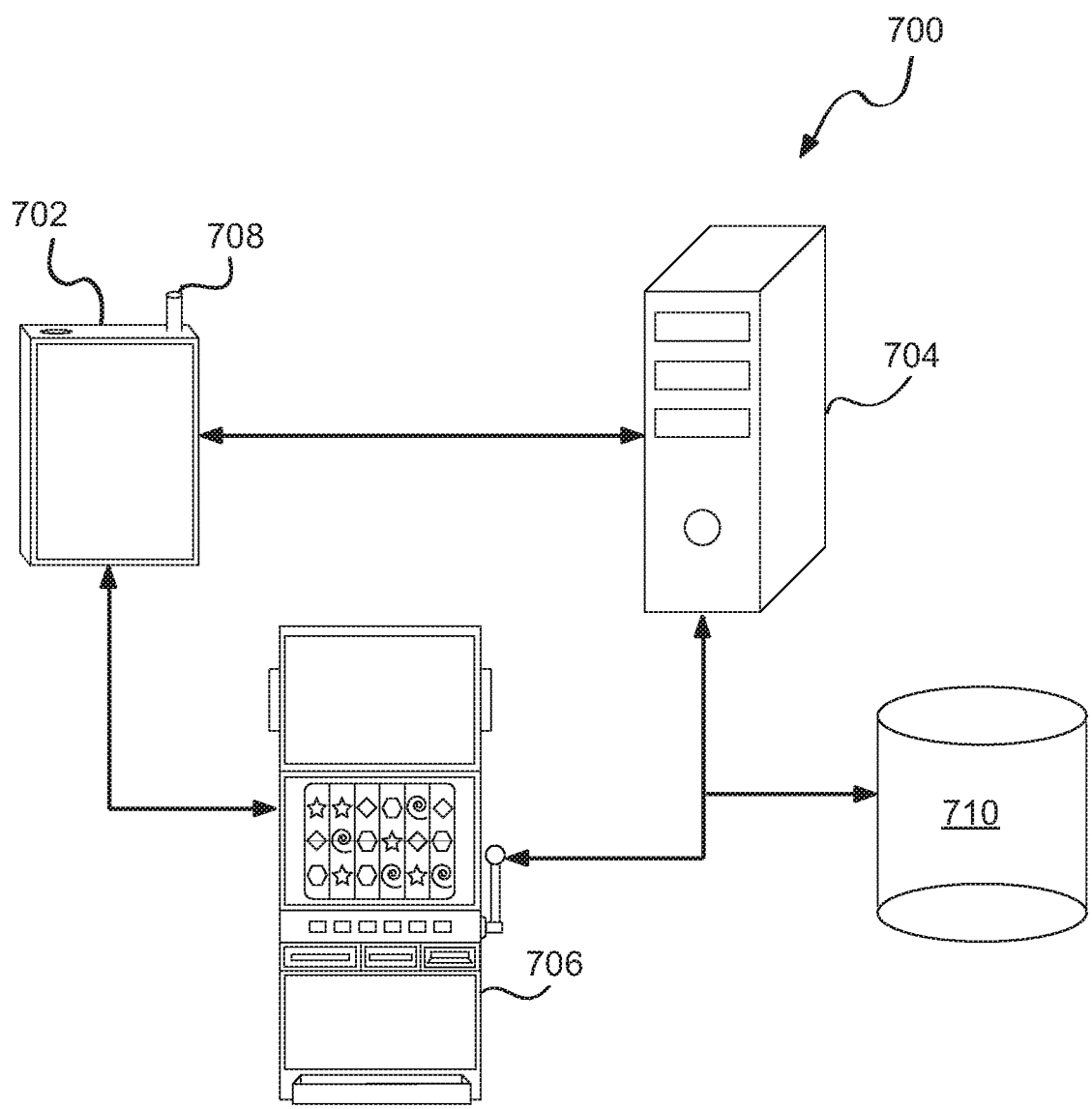
FIG. 7 illustrates a spontaneous player preferences system.

FIG. 7 illustrates one embodiment of a spontaneous player preferences system 700. The spontaneous player preferences system 700 may include at least one portable electronic device 702, a gaming machine 706, a spontaneous interest database 710, and a gaming server 704. While FIG. 7 depicts only one portable electronic device 702, one gaming machine 706, and one gaming server 704, this is not intended to be limiting as the spontaneous player preferences system 700 may include multiple portable electronic devices, multiple gaming machines, and multiple servers for games, progressives, bonuses, player tracking, and the like.

The at least one portable electronic device 702 may be configured to obtain a plurality of spontaneous interest data. The plurality of spontaneous interest data may include, but is not limited to, location data associated with a position of the at least one portable electronic device 702, visual and auditory data acquired by the at least one portable electronic device 702, casino games, services, promotional products, or any other types of data.

The at least one portable electronic device 702 may be similar to a portable electronic device described and illustrated in FIGS. 1A-C. A data transfer interface 708 can be configured to transfer the plurality of spontaneous interest data to either the gaming machine 706 and/or the gaming server 704. In one embodiment, the at least one portable electronic device 702 may also communicate with the gaming server 704 to verify that the gaming machine 706 is available for the player to play a selected game of chance.

The gaming machine 706 may be configured to communicate with the at least one portable electronic device 702, the gaming server 704, and a database 710 via the data transfer interface. The gaming machine 706 may be similar to a gaming machine 300 illustrated in FIG. 3. The gaming machine 706 may be configured to present a plurality of game offerings for a user based upon the received plurality of spontaneous interest data. For example, the gaming machine 706 may present game offerings such as reel-based slot games, video poker, video blackjack, lottery games, or any other type of known games of chance. The gaming machine 706 can also be configured to present at least one user interest offering such as slot games, table games, poker tournaments, blackjack tournaments, food and beverage offerings, music offerings, promotional products, or any other activity or interest that the player may have preferences for. The at least one user interest offering may include at least one entertainment offering such as concert tickets, show tickets, rounds of golf, tourism offerings, night club guest lists, and the like.

The gaming server 704 may be configured to communicated with the at least one portable electronic device 702, the database 710, and the gaming machine 706. The gaming server 704 may be configured to evaluate the plurality of spontaneous interest data to determine the group of game offerings being presented on the gaming machine 706, configured to authenticate the user, or perform any other gaming functions. In one embodiment, the gaming server 704 may be a player tracking server configured to authenticate the player, store prior spontaneous interest data, store player account data, or any other player information stored within database 710. In another embodiment, the gaming server may be a spontaneous interest data server configured to receive the plurality of spontaneous interest data, store prior spontaneous interest data, evaluate the plurality of spontaneous interest data and prior spontaneous interest data stored within database 710, determine the group of game offerings, and perform other similar functions. In one embodiment, database 710 may be an autonomous network attached storage (NAS) or a storage area network (SAN) configured to store prior and current players' spontaneous interest data for retrieval on demand by gaming server 704, gaming machine 706, and/or at least one portable electronic device 702.

Figure 8A:
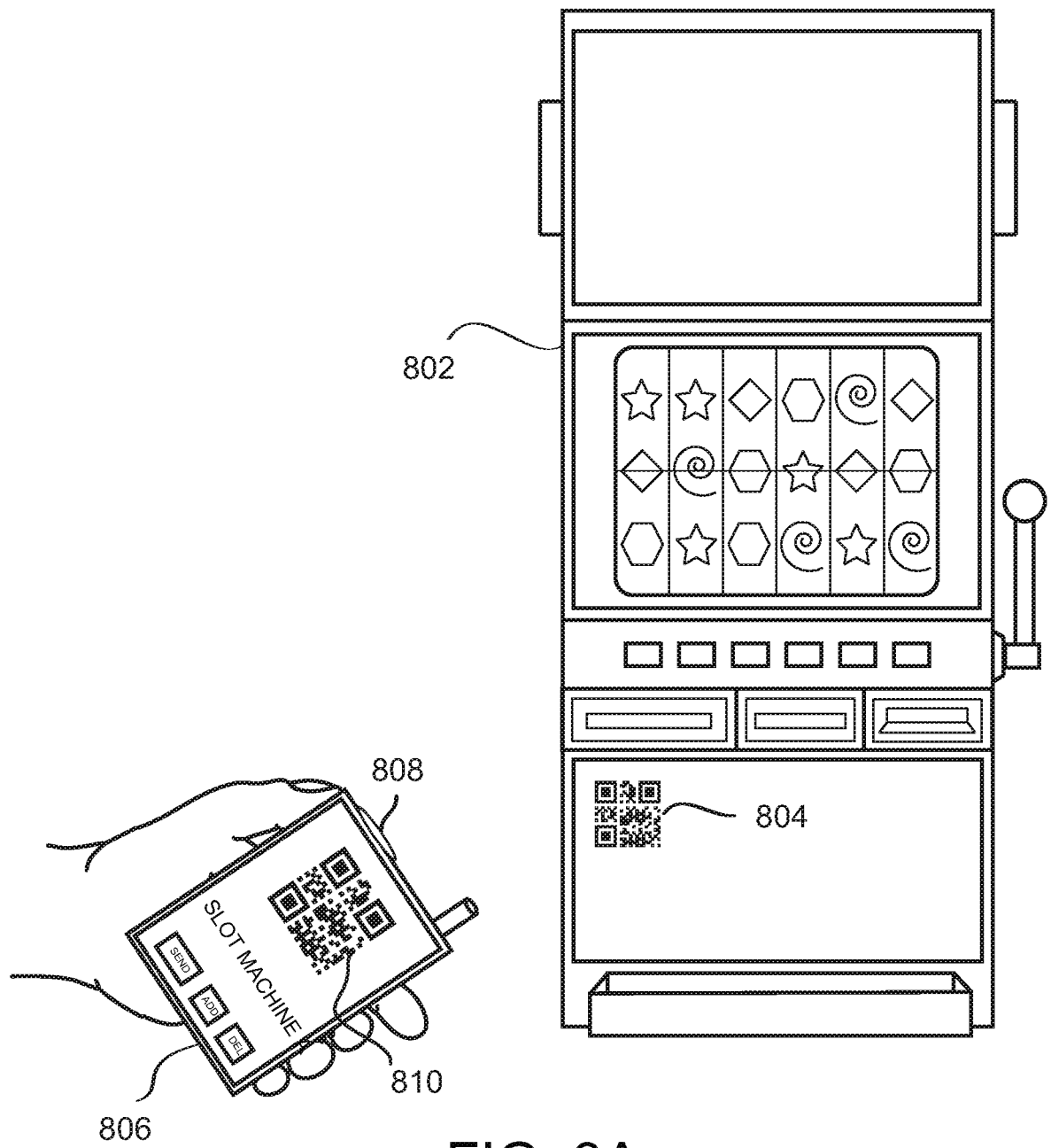
FIG. 8A illustrates an example of a user acquiring spontaneous interest data from a gaming establishment environment using a portable electronic device.

FIG. 8A illustrates an example of a user acquiring spontaneous interest data from a gaming establishment environment using a portable electronic device. Although described with reference of a gaming establishment environment, this disclosure is not intended to be limiting as any type of environment is considered such as a video game environment, auction environment, grocery stores, retail environment, or the like. The gaming establishment environment may include a gaming machine 802 that may be marked with a visible identification marker designed to facilitate spontaneous interest data acquisition by the portable electronic device 806. The visible identification marker may be, but is not limited to a 2D barcode 804. The 2D barcode 804 data may be acquired using an input device 808 of the portable electronic device 806. In one embodiment of the invention, the input device 808 may be a still image camera that photographs 2D barcode 804. The spontaneous interest data application described above may then convert a photograph of 2D barcode 804 into spontaneous interest data that may be evaluated together with other spontaneous interest data stored in the portable electronic device 806. Information associated with each unique barcode may include a product and/or environmental feature identification marker, the product and/or environmental feature location, a list of similar and/or substitute products, the identification marker of the casino establishment, the statistical usage data associated with the product, other user's comments and recommendations, and the like. One or more barcodes may comprise a data set that can be used to evaluate an aggregate spontaneous gaming and/or user interest offering to the user. In one embodiment, the spontaneous interest data associated with a unique barcode can be looked up by the portable electronic device in a database for example, database 710 using the unique barcode as a reference. In another embodiment, the input device 808 may be a barcode reader capable of directly scanning 2D barcode 804. The spontaneous interest data application may then directly receive the spontaneous interest data embodied by 2D barcode 804. Directly embedding spontaneous interest data into a barcode can be simpler to implement, though less flexible than a database implementation as new data can be updated quickly in a database.

After receiving the spontaneous interest data, the portable electronic device 806 may present a confirmation 810 to the user. As illustrated, the spontaneous interest data receipt confirmation 810 may be a representation of the 2D barcode 804 that the user just acquired. In another embodiment, the receipt confirmation may be a text message such as "Gaming Machine A Scanned", a graphical representation of the gaming machine theme, or any other audio or visual confirmation.

The gaming establishment environment may be marked with many forms of a visible identification marker. The visible identification marker may be, but not limited to the 2D barcode 804. The visible identification marker can also be a 1D barcode, a number or alphanumeric sequence entered into a portable electronic device, a picture of a gaming machine, a picture of a table game, a picture of a dining establishment, or a picture of an entertainment option. The entertainment option could be, but is not limited to being a musical show, a concert, a film, or any other dramatic work. The visible identification marker may also be graphical representations of the enumerated examples above.

Figure 8B:
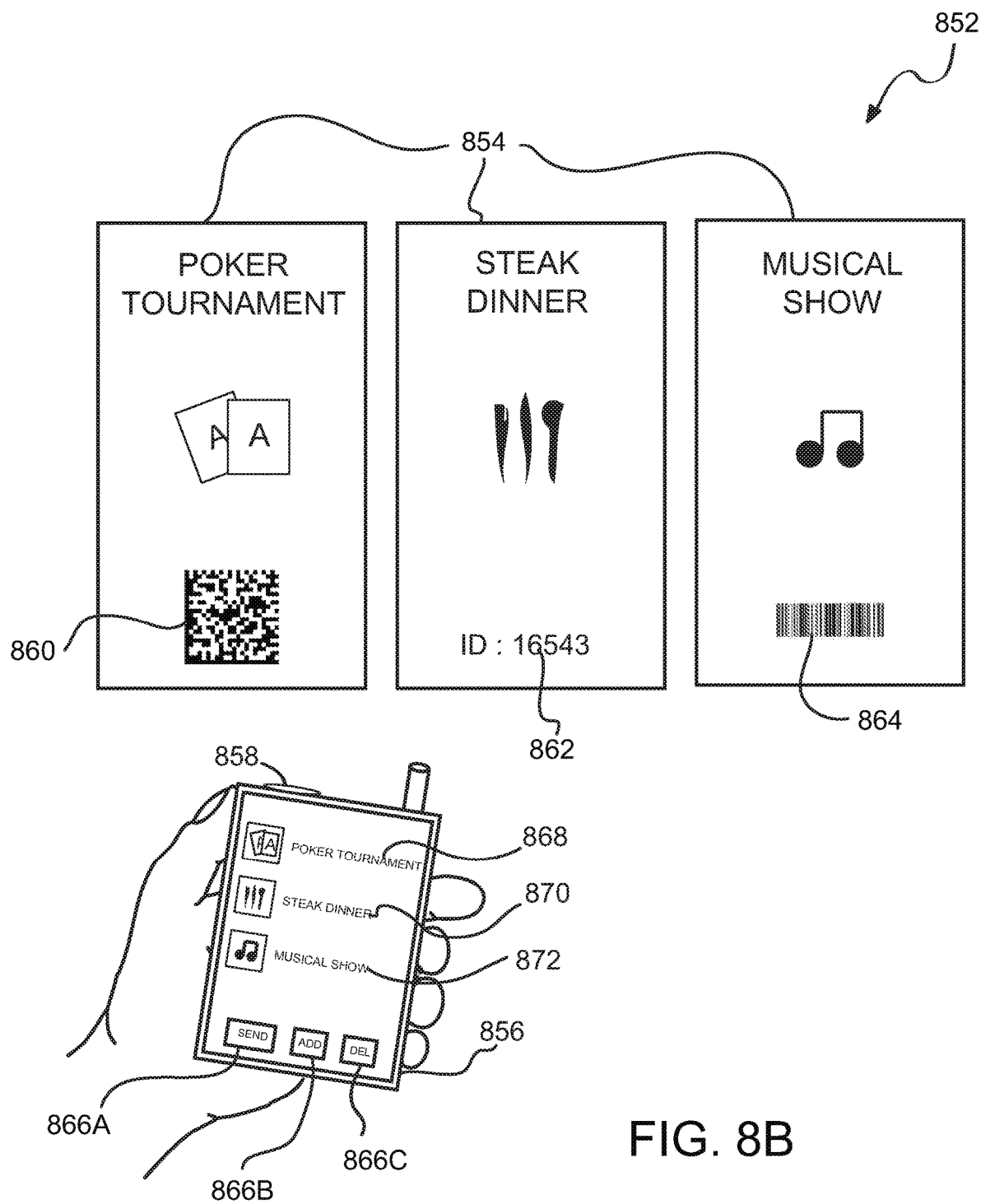
FIG. 8B illustrates various examples of spontaneous interest data.

FIG. 8B illustrates various examples of spontaneous interest data. Spontaneous interest data within an environment 852 may be, but is not limited to any visible identification marker. The user may use a portable electronic device 856 to acquire the spontaneous interest data that may be represented by any visible identification marker. The portable electronic device 856 may acquire the spontaneous interest data by any means as discussed above with reference to FIGS. 1A.-1C. The user interface may display the collected spontaneous interest data 854 and may prompt the user to confirm receipt of the collected spontaneous interest data. The collected spontaneous interest data 854 may comprise spontaneous interest data of various types. For example, spontaneous interest data representing a poker tournament may be represented by a 2D barcode 860 and collected using an input device 858 while spontaneous interest data representing a steak dinner may be manually entered, using the portable electronic device 856, as a numeric code 862. As a further example, spontaneous interest data representing a musical show may be represented by a 1D barcode 864 collected using the input device 858. After collection of at least one spontaneous interest data point, the portable electronic device 856 may store the collected spontaneous interest data and allow a user to collect another spontaneous interest data point.

The user may confirm receipt of the spontaneous interest data 860, representing a poker tournament, by actuating or touching a button labeled "ADD" 866B presented by the user interface. The user may discard the collected spontaneous interest data 860 by actuating or touching a button labeled "DEL" 866C presented to the user by the user interface. The user may also elect to transfer the collected spontaneous interest data to any other device configured to receive the collected spontaneous interest data by actuating or touching a button labeled "SEND" 866A presented to the user by the user interface.

After at least one spontaneous interest data point may be collected, a visual representation of any spontaneous interest data collected may be presented to the user. For example, after collecting spontaneous interest data 860 representing a poker tournament, a visual representation of spontaneous interest data 860 may be displayed on the portable electronic device 856 as "POKER TOURNAMENT" with a corresponding icon 868. As another example, collected spontaneous interest data representing a steak dinner 862 may be displayed on the portable electronic device 856 as "STEAK DINNER" with a corresponding icon 870. As still another example, collected spontaneous interest data representing a musical show 864 may be displayed on the portable electronic device 856 as "MUSICAL SHOW" with a corresponding icon 872.

The information associated with each spontaneous interest data point that may be represented by a unique barcode may include a product and/or environmental feature identification marker, the product and/or environmental feature location, a list of similar and/or substitute products, the identification marker of the casino establishment, the statistical usage data associated with the product, other user's comments and recommendations, and the like. One or more barcodes may comprise a data set that can be used to evaluate an aggregate spontaneous gaming and/or user interest offering to the user. In one embodiment, the spontaneous interest data associated with a unique barcode can be looked up by the portable electronic device in a database for example, database 710 using the unique barcode as a reference. In another embodiment, the data can be embedded in the unique barcode. The direct embedding of data into a barcode can be simpler to implement, though less flexible than a database implementation as new data can be updated quickly in a database.

In yet another embodiment, users can share at least one spontaneous interest data sets with one another. Sharing of at least one spontaneous interest data set may allow friends, family, group members, and the like to share spontaneous mood, preferences, and offerings. In still yet another embodiment, a user may synchronize her portable electronic device's entire spontaneous interest data set, or a selected portion of her entire spontaneous interest data set, with her group's spontaneous interest data, stored in a commonly accessible location, for example a database as depicted by database 710 in FIG. 7. The user may also upload her spontaneous interest data, while simultaneously updating her individual spontaneous interest data, at least one gaming offering, and at least one user interest offering with any group spontaneous interest data, at least one gaming offering, and at least one user interest offering. In again yet another implementation, a user-to-user sharing of an entire spontaneous interest data set and/or a selected portion of an entire spontaneous interest data set can be done by invoking a peer-to-peer synchronization function available within the spontaneous interest data application running on the portable electronic device.

What is claimed is:

1. A portable electronic device for use in a gaming establishment, the portable electronic device comprising:
   a display configured to generate a graphical user interface;
   at least one first sensor configured to detect a positional change associated with the portable electronic device to acquire at least one interest data based on at least one user action initiated physically on the portable electronic device in the gaming establishment, the at least one interest data associated with at least one gaming establishment offering presented at the gaming establishment;
   a second sensor or transceiver to detect a location of the portable electronic device;
   an input device operable to receive at least one input signal to approve or reject the at least one interest data; and
   a processor and memory storing an interest data application, which, when executed, causes the processor to at least:
      present the at least one interest data on the display by generating the graphical user interface, the graphical user interface configured to update based on the at least one input signal,
      store the at least one interest data, when the at least one input signal approves the at least one interest data,
      identify one or more user interest offerings based on at least one of the interest data, the positional change of the portable electronic device, and at least user statistical data,
      present the one or more user interest offerings on the display,
      receive a selection of one of the one or more user interest offerings based on the at least one input signal received at the input device, and
      determine whether the selection is available based, at least in part, on the location of the portable electronic device and the at least one input signal.

2. The portable electronic device of claim 1, wherein the interest data application, when executed, causes the processor to prioritize the one or more user interest offerings identified on the display.

3. The portable electronic device of claim 1, wherein the one or more user interest offerings include at least one non-wager offering.

4. The portable electronic device of claim 3, wherein the non-wager offering comprises services provided at the gaming establishment.

5. The portable electronic device of claim 4, wherein the services provided at the gaming establishment are based on the positional change.

6. The portable electronic device of claim 1, wherein the at least one sensor comprises at least one of a motion sensor, and an orientation sensor.

7. The portable electronic device of claim 1, further comprising an RF transceiver to acquire at least a portion of the interest data.

8. The portable electronic device of claim 1, wherein the user action initiated includes a first user action to detect the positional change, and wherein the interest data application, when executed, causes the processor to stop detecting of the positional change when a second user action is initiated.

9. The portable electronic device of claim 1, wherein the interest data application, when executed, causes the processor to:
    evaluate and prioritize the at least one interest data; and
    periodically update the user interest offerings based on the positional change of the portable electronic device.

10. The portable electronic device of claim 1, wherein the interest data application, when executed, causes the processor to identify one or more alternative user interest offerings if the one or more user interest offerings identified are not available.

11. The portable electronic device of claim 1, wherein the input device comprises a touch screen display.

12. A gaming system for use in a gaming establishment, the gaming system comprising:
    at least one portable electronic device having at least one first sensor configured to detect a positional change associated with the portable electronic device to acquire a plurality of interest data based on at least one user action initiated physically on the portable electronic device and a second sensor or transceiver to detect a location associated with the portable electronic device, the plurality of interest data associated with at least one gaming establishment offering presented at the gaming establishment, the at least one portable electronic device including a processor and memory storing an interest data application, which, when executed, cause the processor to at least:
    acquire the plurality of interest data; and
    store the plurality of interest data;
    a gaming machine configured to communicate with the at least one portable electronic device to receive the plurality of interest data, the gaming machine having a display configured to present one or more user interest offerings based on the plurality of interest data; and
    a gaming server configured to communicate with the at least one portable electronic device and the gaming machine, the gaming server configured to evaluate the plurality of interest data to determine the one or more user interest offerings presented on the gaming machine based, at least in part, on the location of the portable electronic device, wherein the one or more user interest offerings are prioritized based on at least one user statistical data.

13. The gaming system of claim 12, wherein the sensor is selected from the group consisting of a motion sensor, and an orientation sensor.

14. The gaming system of claim 12, wherein the portable electronic device further comprises an RF transceiver to acquire at least a portion of the plurality of interest data.

15. The gaming system of claim 12, wherein the one or more user interest offerings include at least one non-wager offering associated with one or more services provided at the gaming establishment.

16. The gaming system of claim 15, wherein the plurality of interest data includes one of visual data, audio data, radio frequency data, or environmental data, and wherein the services are based on the positional change location data.

17. A method for presenting user interest offerings on a display of a gaming device, comprising:
    acquiring, via at least one sensor configured to detect a positional change of at least one portable electronic device associated with a user, one or more interest data based on at least one user action initiated physically with respect to the at least one portable electronic device, the interest data being associated with at least one gaming establishment offering presented at the at least one gaming establishment;
    identifying location data, acquired via a second sensor or a transceiver, associated with the interest data;
    transmitting the interest data from the portable electronic device to a gaming server;
    identifying, at the gaming server, one or more user interest offerings based on the interest data;
    prioritizing the one or more user interest offerings based on at least one statistical data including at least one preselected user preference;
    storing the interest data and the location data at one or both of the portable electronic device and the gaming server; and
    displaying, via a graphical user interface, the one or more user interest offerings that have been prioritized on the graphical user interface on the display of the gaming device, the displaying based, at least in part, on the interest data and the location data.

18. The method of claim 17, further comprising selecting the at least one sensor from a motion sensor, and an orientation sensor.

19. The method of claim 17, further comprising identifying at least one non-wager offering associated with the one or more user interest offerings, the non-wager offering associated with a service provided at the gaming establishment, wherein the service is based on the location data.

20. The method of claim 17, wherein the at least one user action includes a first user action, further comprising stopping detecting the positional change when a second user action is detected.

21. The method of claim 17, wherein identifying the one or more user interest offerings based on the location data.

22. A gaming system for use in a gaming establishment, the gaming system comprising:
    an interested data application configured to operate on at least one portable electronic device, the at least one portable electronic device having at least one first sensor configured to detect a positional change associated with the portable electronic device to acquire a plurality of interest data based on at least one user action, the plurality of interest data associated with at least one gaming establishment offering presented at the gaming establishment, the at least one portable electronic device including:

a processor and memory storing the interest data application, which, when executed, causes the processor to acquire the plurality of interest data; and store the plurality of interest data, wherein the plurality of interest data includes location data associated with one or more locations of the at least one portable electronic device the location data obtained via a second sensor or a transceiver of the at least one portable electronic device;

a gaming machine configured to communicate with the at least one portable electronic device to receive the plurality of interest data, the gaming machine having a display configured to present one or more user interest offerings based on the plurality of interest data, the one or more user interest offerings presented on a graphical user interface of the display; and a gaming server configured to communicate with the at least one portable electronic device or the gaming machine, the gaming server configured to evaluate the plurality of interest data based on at least one statistical data based on at least one user pre-selected preference to determine the one or more user interest offerings presented on the gaming machine or the at least one portable electronic device based at least in part on the location data.

23. The gaming system of claim 22, wherein the one or more user interest offerings is a wager-based gaming offering.

24. The gaming system of claim 22, wherein the gaming machine is a slot machine.

25. The gaming system of claim 22, wherein the gaming machine is a gaming table.

26. The gaming system of claim 25, wherein the gaming table has a user interface configured to display the one or more user interest offerings.

27. The gaming system of claim 26, wherein the one or more user interest offerings is a wager-based gaming offering.

28. The gaming system of claim 22, wherein the sensor includes at least one of a motion sensor and an orientation sensor.

29. The gaming system of claim 22, wherein the portable electronic device further comprises an RF transceiver configured to communicate with the gaming machine, and the gaming server.

30. The gaming system of claim 22, wherein the portable electronic device comprises an RF transceiver to acquire at least a portion of each of the plurality of interest data.

31. The gaming system of claim 22, wherein the one or more user interest offerings include services provided at the gaming establishment.

32. The gaming system of claim 31, wherein the user action initiated includes first user action to detect the positional change, and wherein the interest data application, when executed, causes the processor to stop detecting the positional change when a second user action is initiated.

33. The gaming system of claim 31, wherein the services are based on the location data.

\* \* \* \* \*